US010037162B2

United States Patent
Makida et al.

(10) Patent No.: US 10,037,162 B2
(45) Date of Patent: Jul. 31, 2018

(54) STORAGE MANAGEMENT DEVICE, STORAGE MANAGEMENT METHOD, AND COMPUTER-READABLE RECORDING MEDIUM

(71) Applicant: FUJITSU LIMITED, Kawasaki-shi, Kanagawa (JP)

(72) Inventors: Toshiharu Makida, Numazu (JP); Kiyoshi Sugioka, Mishima (JP); Joichi Bita, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 52 days.

(21) Appl. No.: 15/132,504

(22) Filed: Apr. 19, 2016

(65) Prior Publication Data
US 2016/0364167 A1    Dec. 15, 2016

(30) Foreign Application Priority Data

Jun. 15, 2015    (JP) .................................. 2015-120637

(51) Int. Cl.
*G06F 3/06*    (2006.01)

(52) U.S. Cl.
CPC .......... *G06F 3/0631* (2013.01); *G06F 3/0604* (2013.01); *G06F 3/0673* (2013.01)

(58) Field of Classification Search
CPC ..... G06F 3/0604; G06F 3/0631; G06F 3/0673
See application file for complete search history.

(56) References Cited

U.S. PATENT DOCUMENTS

| 6,397,258 | B1 | 5/2002 | Tsuji et al. |
| 6,408,359 | B1 | 6/2002 | Ito et al. |
| 7,305,520 | B2 | 12/2007 | Voigt et al. |
| 8,209,511 | B2 | 6/2012 | Tomita et al. |
| 8,683,025 | B2 | 3/2014 | Minato |
| 8,843,672 | B2 | 9/2014 | Oe et al. |
| 2004/0043755 | A1 | 3/2004 | Shimooka et al. |

(Continued)

FOREIGN PATENT DOCUMENTS

| JP | 09-006678 | 1/1997 |
| JP | 10-275059 A | 10/1998 |

(Continued)

OTHER PUBLICATIONS

U.S. Office Action dated Dec. 29, 2017 for co-pending U.S. Appl. No. 14/926,054, 20 pages.

(Continued)

*Primary Examiner* — Aracelis Ruiz
(74) *Attorney, Agent, or Firm* — Fujitsu Patent Center

(57) ABSTRACT

A monitoring unit acquires load information on a Tier pool that includes therein a plurality of volumes. A maximum performance calculating unit calculates, on the basis of the load information on the volumes acquired by the monitoring unit, an entire bandwidth of the Tier pool. A bandwidth management unit calculates, on the basis of the minimum guarantee bandwidth for each of the predetermined volumes, each of individual bandwidths such that the sum total of the individual bandwidths allocated to the respective volumes corresponds to the entire bandwidth calculated by the maximum performance calculating unit 101 and allocates the calculated individual bandwidths to the respective volumes.

7 Claims, 12 Drawing Sheets

(56) References Cited

U.S. PATENT DOCUMENTS

| | | | |
|---|---|---|---|
| 2004/0181594 A1 | 9/2004 | Suleiman | |
| 2005/0172097 A1 | 8/2005 | Voigt et al. | |
| 2007/0283120 A1* | 12/2007 | Fujita | G06F 3/0613 |
| | | | 711/170 |
| 2008/0126525 A1 | 5/2008 | Ueoka et al. | |
| 2009/0307341 A1 | 12/2009 | Minato | |
| 2011/0252214 A1 | 10/2011 | Naganuma et al. | |
| 2012/0265907 A1 | 10/2012 | Oe et al. | |
| 2012/0317358 A1 | 12/2012 | Ando et al. | |
| 2013/0159557 A1* | 6/2013 | Bita | G06F 3/0604 |
| | | | 710/6 |
| 2014/0244959 A1 | 8/2014 | Oe et al. | |
| 2014/0317348 A1 | 10/2014 | Watanabe et al. | |
| 2016/0364167 A1 | 12/2016 | Makida et al. | |

FOREIGN PATENT DOCUMENTS

| | | |
|---|---|---|
| JP | 2001-057571 | 2/2001 |
| JP | 2001-57571 A | 2/2001 |
| JP | 2004-86512 A | 3/2004 |
| JP | 2005-50007 A | 2/2005 |
| JP | 2005-222539 | 8/2005 |
| JP | 2005-222539 A | 8/2005 |
| JP | 2007-323284 | 12/2007 |
| JP | 2008-083939 | 4/2008 |
| JP | 2009-294810 | 12/2009 |
| JP | 2009-294810 A | 12/2009 |
| JP | 2012-221340 | 11/2012 |
| JP | 2012-221340 A | 11/2012 |
| JP | 2014-164510 | 9/2014 |
| JP | 2014-215666 | 11/2014 |
| WO | 2011/092739 | 8/2011 |
| WO | 2012/169027 A1 | 12/2012 |

OTHER PUBLICATIONS

U.S. Office Action dated May 22, 2018 for co-pending U.S. Appl. No. 14/926,054, 15 pages.

Japanese Office Action dated May 15, 2018 for corresponding Japanese Patent Application No. 2014-235084, with English Translation, 7 pages.

* cited by examiner

| VOLUME IDENTIFICATION INFORMATION | TIER POOL NUMBER | BANDWIDTH |
|---|---|---|
| Storage=1, VolNo=1 | 1 | 10MB/s, 100IOPS |
| Storage=1, VolNo=2 | 1 | 20MB/s, 200IOPS |
| Storage=2, VolNo=1 | 2 | 15MB/s, 150IOPS |
| Storage=2, VolNo=2 | 3 | 100MB/s, 1000IOPS |

| PERFORMANCE MEASUREMENT DATE AND TIME | VOLUME IDENTIFICATION INFORMATION | ACTUAL MEASUREMENT PERFORMANCE ||||| 
|---|---|---|---|---|---|---|
| | | RESPONSE TIME | THROUGHPUT | IOPS | CACHE HIT RATE | DELAY TIME |
| 20110101000000-20110101000030 | Storage=1, VolNo=1 | 10ms | 12MB/s | 100IOPS | 10% | 0ms |
| 20110101000000-20110101000030 | Storage=1, VolNo=2 | 11ms | 9MB/s | 100IOPS | 9% | 1ms |
| 20110101000000-20110101000030 | Storage=2, VolNo=1 | 12ms | 8MB/s | 100IOPS | 8% | 2ms |
| 20110101000000-20110101000030 | Storage=2, VolNo=2 | 13ms | 7MB/s | 100IOPS | 7% | 3ms |
| 20110101000030-20110101000100 | Storage=1, VolNo=1 | 11ms | 11MB/s | 110IOPS | 10% | 0ms |
| 20110101000030-20110101000100 | Storage=1, VolNo=2 | 12ms | 10MB/s | 120IOPS | 9% | 1ms |
| 20110101000030-20110101000100 | Storage=2, VolNo=1 | 13ms | 9MB/s | 130IOPS | 8% | 2ms |
| 20110101000030-20110101000100 | Storage=2, VolNo=2 | 14ms | 8MB/s | 140IOPS | 7% | 3ms |

| PERFORMANCE MEASUREMENT DATE AND TIME | RESOURCE TYPE | ACTUAL MEASUREMENT PERFORMANCE | | | |
|---|---|---|---|---|---|
| | | IDENTIFICATION INFORMATION | THROUGHPUT | IOPS | BUSY RATE |
| 20110101000000-20110101000030 | TierPool | 1 | 102MB/s | 100IOPS | 10% |
| 20110101000000-20110101000030 | TierPool | 2 | 91MB/s | 100IOPS | 9% |

STORAGE MANAGEMENT DEVICE, STORAGE MANAGEMENT METHOD, AND COMPUTER-READABLE RECORDING MEDIUM

CROSS-REFERENCE TO RELATED APPLICATION

This application is based upon and claims the benefit of priority of the prior Japanese Patent Application No. 2015-120637, filed on Jun. 15, 2015, the entire contents of which are incorporated herein by reference.

FIELD

The embodiments discussed herein are directed to a storage management device, a storage management method, and a computer-readable recording medium.

BACKGROUND

In recent years, with the virtualization of open systems and servers, management of systems is becoming complicated. Consequently, using storage systems becomes common in terms of easily managing the systems or flexibly coping with a rapid increase in an amount of data.

In the storage systems, performance adjustment of the storage systems is performed by adjusting band limit widths of data transfer paths between, for example, volumes and a server that executes an application. In a conventional technology, adjustment of the band limit widths is performed by a storage system received an instruction from an administrator.

Furthermore, as a technology for adjusting the performance in a storage system, there is a conventional technology that estimates a use capacity for each axis area group by using both a load threshold and past information on pool status information representing both the allocation with respect to a disk pool and the load. Furthermore, there is a conventional technology that has the minimum band of a storage area, that calculates, when the storage area has already been allocated to a selected interface, the sum total of storage areas acquired from an access ratio, and that performs allocation if the access ratio does not exceed 100% even if the band of the storage area to be created is added.

Patent Document 1: International Publication Pamphlet No. WO 2011/092739
Patent Document 2: Japanese Laid-open Patent Publication No. 2007-323284

However, in the method that specifies each of the bands to be allocated to individual volumes, if a target performance is manually set for each volume in order to limit the band, the setting of the band limit is complicated and thus it is difficult to efficiently use the bandwidth. Furthermore, if a bandwidth of a single volume is adjusted, contention occurs with another volume when data is transferred and the load applied to the other volume is increased, which may possibly result in a decrease in the performance.

Thus, it is conceivable to automatically adjust the band by using the most recent data; however, because band limitation is performed by using the most recent data, the bandwidth is gradually decreased. Consequently, it is difficult to efficiently use the bandwidth.

Furthermore, when using the conventional technology that estimates a use capacity for each axis area group by using both the load threshold and the past information on the pool status information, the performance adjustment is implemented by allocating storage areas with different performance; therefore, it is difficult to efficiently use the bandwidth. Furthermore, with the conventional technology that performs allocation unless the access ratio exceeds 100% even if the band of the storage area to be created is added, a user sets the value of the capacity of the resource. However, with this method, the setting of limitations to be performed is complicated and thus it is difficult to efficiently use the bandwidth.

SUMMARY

According to an aspect of an embodiment, a storage management device includes: a load information acquiring unit that acquires load information on a storage area group that includes therein a plurality of storage areas; a calculating unit that calculates, on the basis of the load information on the storage area group acquired by the load information acquiring unit, an entire bandwidth of the storage area group; and an allocating unit that calculates, on the basis of a minimum guarantee bandwidth for each of the predetermined storage areas, each of individual bandwidths such that the sum total of the individual bandwidths allocated to the respective storage areas corresponds to the entire bandwidth calculated by the calculating unit and allocates the calculated individual bandwidths to the respective storage areas.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a schematic diagram illustrating an example of a QoS setting table;

FIG. 5 is a schematic diagram illustrating an example of a volume performance information file;

FIG. 6 is a schematic diagram illustrating an example of a Tier performance information file;

DESCRIPTION OF EMBODIMENTS

Preferred embodiments of the present invention will be explained with reference to accompanying drawings. The storage management device, the storage management method, and the storage management program disclosed in the present invention are not limited to the embodiments described below.

[a] First Embodiment

Figure 1:
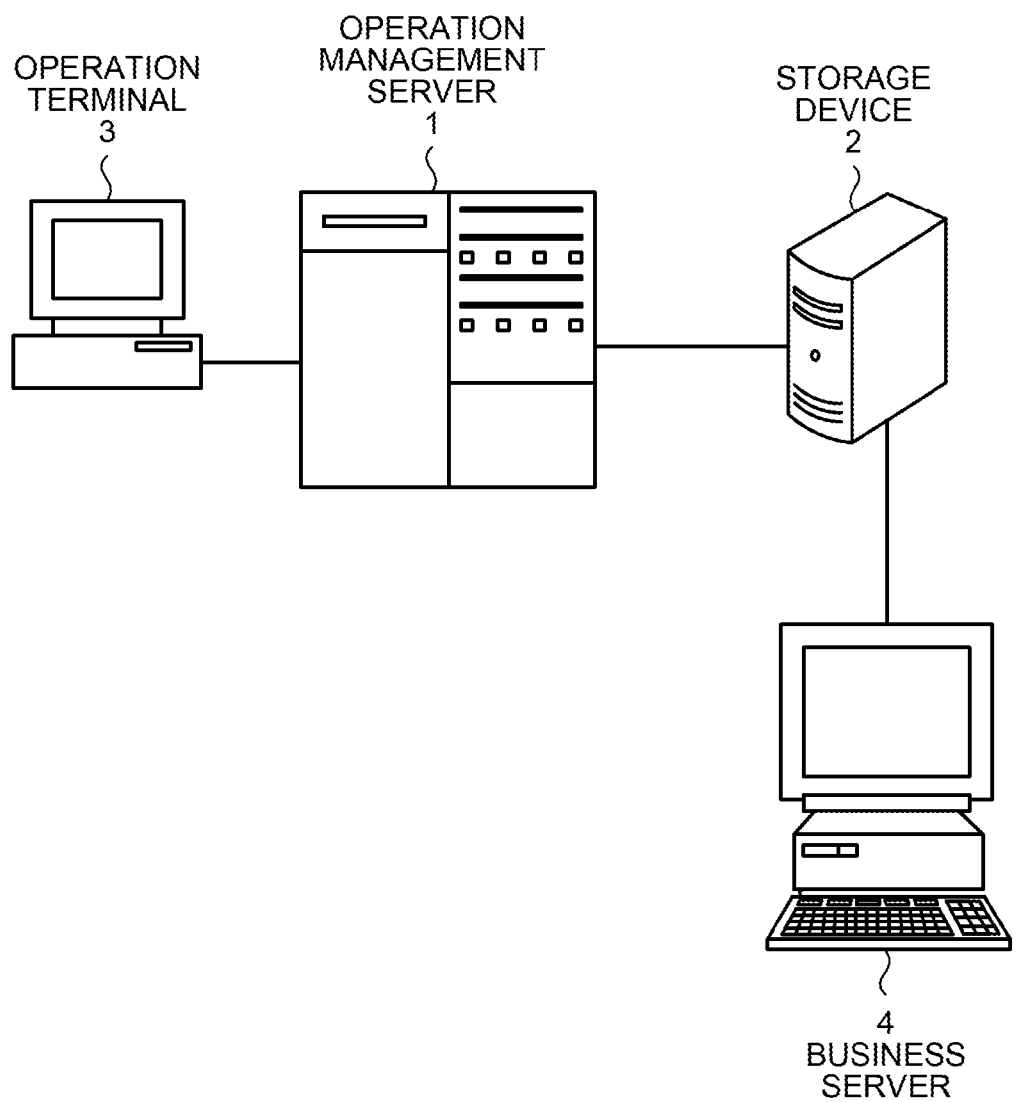
FIG. 1 is a schematic diagram illustrating, in outline, a storage system according to a first embodiment.

FIG. 1 is a schematic diagram illustrating, in outline, a storage system according to a first embodiment. As illustrated in FIG. 1, the storage system according to the first embodiment includes an operation management server 1, a storage device 2, an operation terminal 3, and a business server 4. Here, in FIG. 1, the single storage device 2 is illustrated; however, the number of the storage devices 2 is not limited. Furthermore, only the single business server 4 is illustrated; however, the number of the business servers 4 is not also limited.

The operation terminal 3 is connected to the operation management server 1 via a network. The operation terminal 3 sends, to the operation management server 1, an instruction to perform a process on the storage device 2 or the like. Furthermore, the operation terminal 3 displays a message or the like sent from the operation management server 1 on a monitor and notifies an operator of the message.

The operation management server 1 operates and manages the storage device 2. The operation management server 1 executes a Quality of Service (QoS) control program or a storage management program. The operation management server 1 mentioned here corresponds to an example of a "storage management device".

Specifically, the operation management server 1 performs control of QoS in the storage device 2. The QoS is a function of setting performance that is used such that the storage device 2 maintains the stable performance and adjusts the bandwidth of a volume, which will be described later. Furthermore, the operation management server 1 controls the storage device 2 in accordance with the instruction that is input from the operation terminal 3. For example, the operation management server 1 instructs the storage device 2 to configure the RAID that is input from the operation terminal 3.

In response to an instruction from the application running on the business server 4, the storage device 2 reads or writes data by using the QoS. Furthermore, the storage device 2 receives an instruction to adjust the bandwidth of a volume or the like from the operation management server 1 and performs control of the QoS.

The business server 4 executes a business application. When the business server 4 executes the application, the business server 4 reads or writes data from or to the storage device 2. The application executed by the business server 4 is not particularly limited as long as the application sends and receives data to and from the storage device 2.

Figure 2:
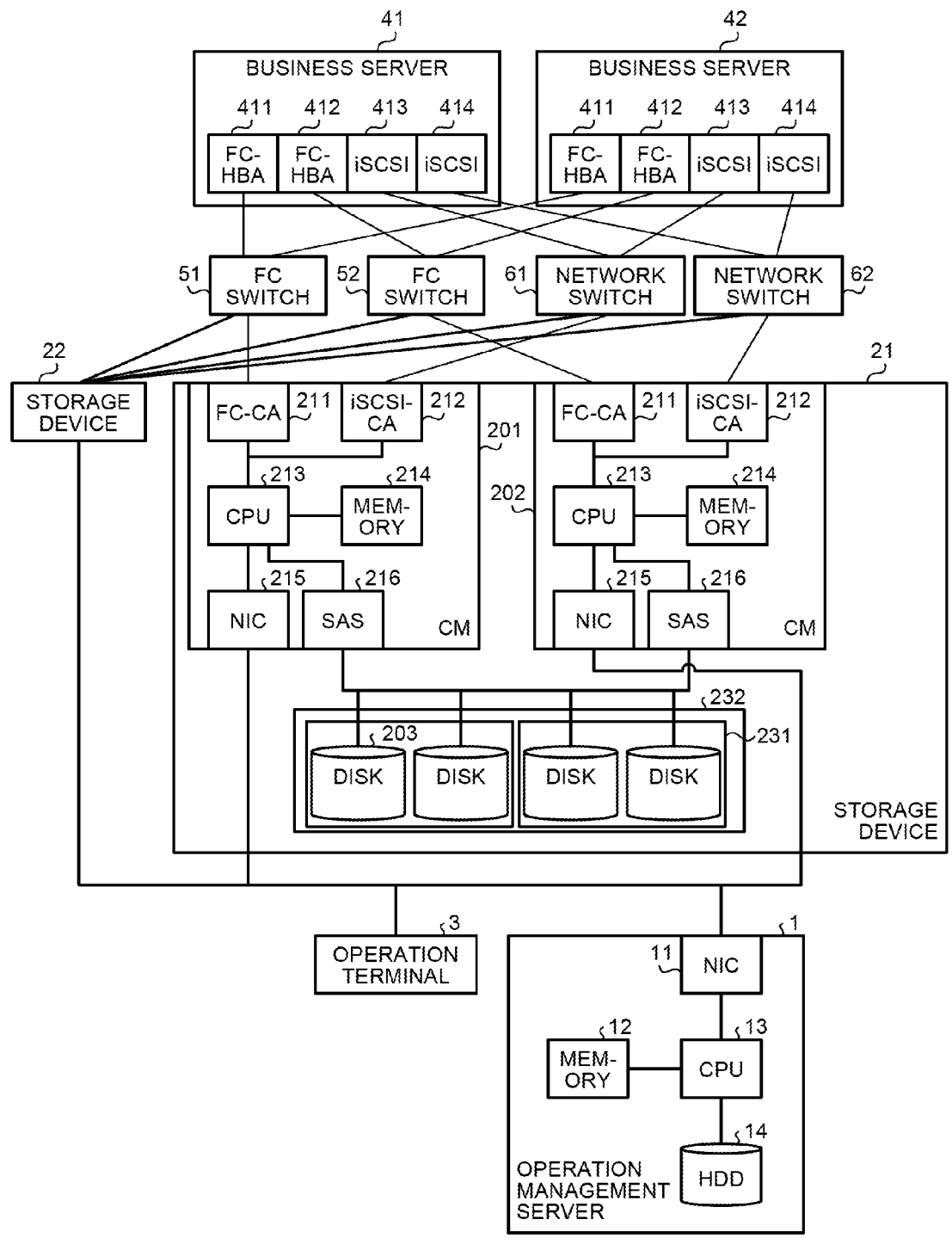
FIG. 2 is a schematic diagram illustrating the hardware configuration of the storage system.

FIG. 2 is a schematic diagram illustrating the hardware configuration of the storage system. FIG. 2 illustrates the state in which storage devices 21 and 22 are arranged as the storage device 2. Furthermore, FIG. 2 illustrates the state in which business servers 41 and 42 are arranged as the business server 4.

The business server 4 includes Fiber Channel-Host Bus Adapters (FC-HBAs) 411 and 412 and Internet Small Computer System Interfaces (iSCSIs) 413 and 414. Here, in the first embodiment, the two FC-HBAs 411 and 412 are illustrated; however, any number of FC-HBAs may also be mounted on the business server 4. Furthermore, the two iSCSIs 413 and 414 are illustrated; however any number of iSCSIs may also be mounted on the business server 4.

The FC-HBAs 411 and 412 are communication interfaces for data communication performed by using Fibre channels. The FC-HBAs 411 and 412 are connected to FC switches 51 and 52, respectively.

The iSCSIs 413 and 414 are communication interfaces for data communication conforming to the iSCSI standard. The iSCSIs 413 and 414 are connected to network switches 61 and 62, respectively.

The FC switches 51 and 52 relay communication by using Fibre channels between the storage device 2 and the business server 4. The FC switches 51 and 52 connect the FC-HBAs 411 and 412, respectively, and connect Channel Adapters (FC-CAs) 211, respectively.

The network switches 61 and 62 relay communication between the storage device 2 and the business server 4 by using the iSCSIs. The network switches 61 and 62 connect the iSCSIs 413 and 414, respectively, and iSCSI-CAs 212, respectively.

The storage device 2 includes Controller Modules (CMs) 201 and 202 and disks 203.

The CMs 201 and 202 have the same function. Thus, in the following, the CM 201 will be described as an example.

The CM 201 includes the FC-CA 211, the iSCSI-CA 212, a central processing unit (CPU) 213, a memory 214, a network interface card (NIC) 215, and a Serial Attached SCSI (SAS) 216.

The FA-CA 211, the iSCSI-CA 212, the memory 214, the NIC 215, and the SAS 216 are connected to the CPU 213.

The CPU 213 sends and receives data to and from the business server 4 via the FC-CA 211 and the iSCSI-CA 212.

Furthermore, the CPU 213 reads and writes data from and to the disks 203 via the SAS 216.

Furthermore, the CPU 213 performs communication with the operation terminal 3 and the operation management server 1 via the NIC 215. For example, when the CPU 213 receives an instruction to adjust the bandwidth, which will be described later, from the operation management server 1, the CPU 213 adjusts the bandwidth of each of the disks 203 in accordance with the instruction.

The operation management server 1 includes a NIC 11, a memory 12, a CPU 13, and an HDD 14. The HDD 14 stores therein various kinds of programs including a QoS control program or a storage management program. The NIC 11 is an interface for communication with the storage device 2 and the operation terminal 3.

The CPU 13 reads various kinds of programs from the HDD 14, loads the programs in the memory 12, and executes the QoS control program, the storage management program, or the like.

A plurality of disks 203 is mounted on the storage device 2. In FIG. 2, a RAID group is formed by the plurality of disks 203 and constructed as volumes 231. The volumes 231 are logical volumes. The volumes 231 mentioned here correspond to an example of "storage areas". However, the configuration is not limited to the embodiment; the RAID group does not need to be constructed in the disk 203. Furthermore, in FIG. 2, a single RAID group is used as the single volume 231; however, a plurality of the volumes 231 may also be formed in a single RAID group. Furthermore, a Tier pool 232 that includes a plurality of the volumes 231 is formed. The Tier pool 232 indicates tiers in the tiered storage device 2. The Tier pool 232 is divided into tiers, such as a high-speed tier, a medium-speed tier, a low-speed tier, or the like. The Tier pool 232 mentioned here corresponds to an example of a "storage area group".

In the following, writing and reading of data performed by the CPU 213 will be described. The CPU 213 receives, from a business application running on the business server 4, a read command that is an instruction to read data or a write command that is an instruction to write data. At this point, the read command or the write command is sent to the CPU 213 via, for example, the port of the FC switch 51 and the port of the FC-CA 211. Then, the CPU 213 reads or writes data from or to the volume 231 of the disk 203 in accordance with the received command. At this point, the data is written to or read from the volume 231 in accordance with the configuration of the RAID group. Furthermore, here, a description has been given of a case in which the CPU 213 in the CM 201 reads and writes data; however, the same process is also performed in the CPU 213 in the CM 202.

Namely, in a case of data transfer, such as writing or reading data, contention occurs in the port of the FC switch 51, in the port of the FC-CA 211 or the iSCSI-CA 212, in the CPU 213 that serves as a processing processor that processes the data, and in the volumes 231.

If contention of each of the resources occurs at the time of data transfer, the performance of the data transfer is decreased. Thus, in a transmission path that is used by the resources in which the contention occurs, by adjusting the bandwidth of each of the volumes 231 that use the subject transmission path, it is possible to eliminate the contention occurring in the resources and thus it is possible to maintain the performance of the data transfer in a high state. Thus, in the following, adjustment of the bandwidth of each of the volumes 231 will be described. In the following, a description will be given of a case in which the business server 4 and the storage device 2 are connected via the FC switch 51. Furthermore, in the following, a description will be given of using the Tier pool 232 as a unit of band adjustment of the volumes 231; however, the unit of band adjustment is not limited to this and may also be, for example, a RAID group or the entirety of the storage device 2.

Figure 3:
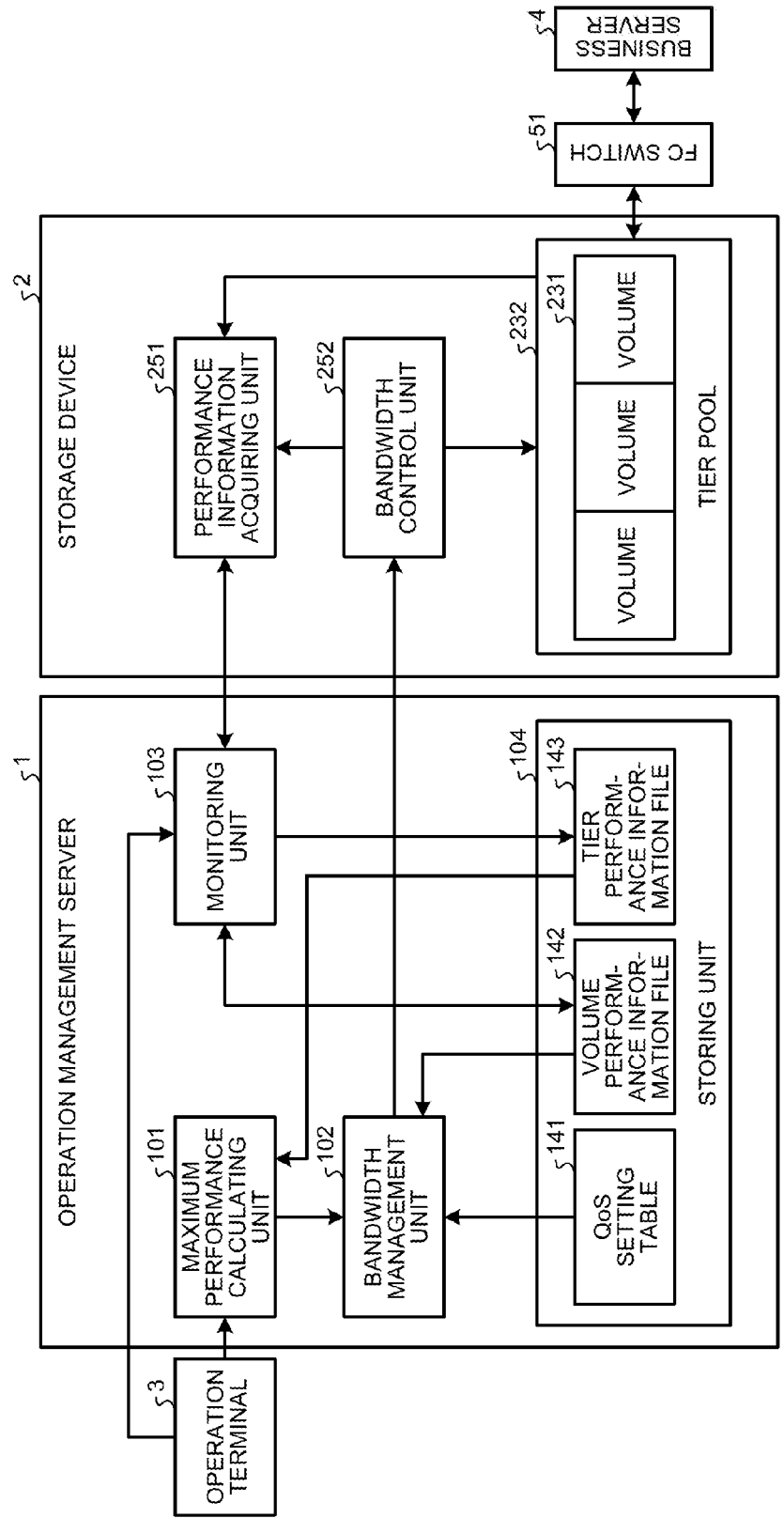
FIG. 3 is a block diagram illustrating an operation management server and a storage device according to the first embodiment.

FIG. 3 is a block diagram illustrating the operation management server and the storage device according to the first embodiment. The operation management server 1 includes a maximum performance calculating unit 101, a bandwidth management unit 102, a monitoring unit 103, and a storing unit 104. Furthermore, the storage device 2 includes a performance information acquiring unit 251 and a bandwidth control unit 252. Furthermore, the storage device 2 includes the Tier pool 232 that includes therein a plurality of the volumes 231 generated from the disk 203.

The storing unit 104 includes predetermined information storage areas each of which stores therein one of a QoS setting table 141, a volume performance information file 142, and a Tier performance information file 143. Furthermore, each of the information storage areas does not need to store therein each of the tables themselves but may also store therein information that is used to create a table at the time of control. The function of the storing unit 104 is implemented by, for example, the HDD 14 illustrated in FIG. 2.

FIG. 4 is a schematic diagram illustrating an example of a QoS setting table. In the first embodiment, in the QoS setting table 141, volume identification information, a Tier pool number, and a bandwidth are associated and registered.

The volume identification information is information for uniquely specifying the volumes 231. In the first embodiment, the volume identification information is represented by the number allocated to the storage device 2 and the number allocated to the volume 231. For example, if it is assumed that the storage device 21 illustrated in FIG. 2 is No. 1, and the storage device 22 is No. 2, "Storage=1, Vol No=1" indicates the volume 231 with the volume number of 1 in the storage device 21.

Furthermore, the Tier pool number is identification information of the Tier pool 232 to which the volume 231 that stores therein the associated volume identification information belongs.

Furthermore, the bandwidth is a bandwidth that is set in the volume 231 that stores therein the associated volume identification information. In FIG. 4, the bandwidth is represented by two types, i.e., amount of data per second (MB Per Second) that represents the throughput and the number of read/write operations (Input Output Per Second: IOPS).

FIG. 5 is a schematic diagram illustrating an example of a volume performance information file. In the volume performance information file 142, information indicating the performance of the actual measurement of each of the volumes 231 is registered. In the first embodiment, in the volume performance information file 142, in addition to the performance measurement date and time on which the measurement is performed, the volume identification information, the actual measurement response time, the actual measurement throughput, the actual measurement IOPS, the actual measurement cache hit rate, and the actual measurement delay time are associated and registered. In the description below, the volume identification information, the actual measurement response time, the actual measurement throughput, the actual measurement IOPS, the actual measurement cache hit rate, and the actual measurement delay time are sometimes be collectively referred to as "performance information on a volume".

The actual measurement response time is the response time measured when data is read from and written to the volume 231 that holds the associated volume identification information. The actual measurement throughput is the throughput measured when data is read from and written to the volume 231 that holds the associated volume identification information. The actual measurement IOPS is the IOPS measured when data is read from and written to the volume 231 that holds the associated volume identification information. The actual measurement cache hit rate is the cache hit rate measured when data is read from and written to the volume 231 that holds the associated volume identification information. The actual measurement delay time is the delay time measured when data is read from and written to the volume 231 that holds the associated volume identification information.

FIG. 6 is a schematic diagram illustrating an example of a Tier performance information file. In the Tier performance information file 143, information that indicates the performance of the actual measurement of each of the Tier pools 232 is registered. In the first embodiment, in the Tier performance information file 143, in addition to the performance measurement date and time on which measurement was performed, the resource type that indicates the resource type is the Tier pool 232, the identification information of the Tier pool 232, the actual measurement throughput, the actual measurement IOPS, and the Busy rate are associated and registered. In the description below, the Tier identification information, the actual measurement throughput, and the actual measurement IOPS are sometimes collectively referred to as "performance information on a Tier pool".

The identification information on the Tier pool 232 is information for uniquely specifying which one of the Tier pools 232. The actual measurement throughput is the throughput measured when data is read from and written to the Tier pool 232 that holds the associated identification information. The actual measurement IOPS is IOPS measured when data is read from and written to the Tier pool 232 that holds the associated identification information. The Busy rate is the Busy rate measured when data is read from and written to the Tier pool 232 that holds the associated identification information.

A description will be given here by referring back to FIG. 3. The monitoring unit 103 receives, from the operation terminal 3, an instruction to start performance collection sent from an operator. Then, the monitoring unit 103 starts periodically receiving, from the performance information acquiring unit 251, the performance information on the volumes 231 and the Tier pool 232. Here, instead of the Busy rate of the Tier pool 232, the monitoring unit 103 acquires the Busy rate of the disks 203 that are included in the Tier pool 232. Then, the monitoring unit 103 calculates a Busy rate of the Tier pool 232 by using the Busy rate of each of the disks 203 included in the Tier pool 232.

In the first embodiment, the monitoring unit 103 calculates a simple average of the Busy rates of all of the disks 203 included in the certain Tier pool 232 and sets the calculation result as the Busy rate of the subject Tier pool 232. However, the method of calculating the Busy rate of the Tier pool 232 is not limited to this.

For example, the monitoring unit 103 may also calculate a Busy rate by using the following method. First, the monitoring unit 103 calculates, for each RAID group included in the Tier pool 232, a simple average of the Busy rates of all of the disks 203 included in the subject RAID group. Then, the monitoring unit 103 may also set, as the Busy rate of the Tier pool 232, a weighted average of weightings obtained by multiplying a predetermined coefficient by the Busy rate obtained from each RAID group.

Then, the monitoring unit 103 writes the received performance information on each of the volumes 231 to the volume performance information file 142. Furthermore, the monitoring unit 103 writes the received performance information on the Tier pool 232 and the calculated Busy rate to the Tier performance information file 143. The monitoring unit 103 mentioned here corresponds to an example of a "load information acquiring unit".

Here, in the first embodiment, the description has been given by using the volume performance information file 142 and the Tier performance information file 143 illustrated in FIGS. 5 and 6; however, these tables may also have another format. For example, the table that indicates the identification information on the Tier pool 232, the table that indicates the relationship between a RAID group and the Tier pool 232, the table that indicates the relationship between the disk 203 and the RAID group are stored in the storing unit 104. Furthermore, the table that stores therein the Busy rate of each of the disks 203 is stored in the storing unit 104. Then, the monitoring unit 103 may also write the Busy rate of each of the disks 203 and the maximum performance calculating unit 101 may also calculate a Busy rate of the Tier pool 232.

The maximum performance calculating unit 101 acquires, from a setup file, an input received from an operator by using the operation terminal 3, or the like, an instruction indicating which one of the IOPS and the throughput is designated as the index of the band adjustment. In the description below, a description will be given of a case in which the throughput is designated as the index of the band adjustment. Furthermore, the maximum performance calculating unit 101 specifies, by using an input received from an operator or the like, the Tier pool 232 in which the bandwidth is to be adjusted. In the description below, the Tier pool 232 designated as the target for the adjustment of the bandwidth of each of the volumes 231 is referred to as the "adjustment target Tier pool 232". Here, in the first embodiment, a description will be given of a case of adjusting the bandwidth of the volumes 231 that are included in the designated Tier pool 232; however, for example, the Tier pools 232 are selected one by one and then the bandwidths of the volumes 231 about all of the Tier pools 232 may also be adjusted.

The maximum performance calculating unit 101 acquires information on the actual measurement throughput of the adjustment target Tier pool 232 from the Tier performance information file 143. Furthermore, the maximum performance calculating unit 101 acquires the Busy rate of the adjustment target Tier pool 232 from the Tier performance information file 143.

Then, the maximum performance calculating unit 101 calculates the maximum transfer capacity of the adjustment target Tier pool 232, i.e., the maximum bandwidth, by using Expression 1 below. The maximum transfer capacity mentioned here corresponds to an example of the "entire bandwidth".

$$B_{MAX} = \frac{B}{U}\gamma \qquad (1)$$

where, $B_{MAX}$ represents the maximum transfer capacity of the Tier pool 232. Furthermore, B represents the actual measurement performance of the Tier pool 232 and is, in the first embodiment, the actual measurement throughput. Furthermore, U is the Busy rate of the Tier pool 232. Furthermore, γ represents a constant greater than 0 and equal to or less than 1.

Here, without the coefficient γ, in Expression 1, the actual measurement performance is proportional to the Busy rate and, the maximum transfer capacity reaches when the Busy rate becomes 100%. However, in practice, if the Busy rate becomes high, the performance (throughput) reaches the upper limit. Thus, although the Busy rate varies depending on a load pattern of the load related to the Tier pool 232, it is conceivable that the transfer capacity is the maximum at about 80% of the Busy rate. Thus, it is preferable to set γ to 0.8.

Then, the maximum performance calculating unit 101 notifies the bandwidth management unit 102 of the information on the calculated maximum transfer capacity of the adjustment target Tier pool 232 together with the identification information on the adjustment target Tier pool 232. The maximum performance calculating unit 101 mentioned here corresponds to an example of a "calculating unit".

The bandwidth management unit 102 receives, from the maximum performance calculating unit 101, a notification of the information on the maximum transfer capacity of the adjustment target Tier pool 232 together with the identification information on the adjustment target Tier pool 232. Then, the bandwidth management unit 102 specifies, from the QoS setting table 141, the volumes 231 included in the adjustment target Tier pool 232. Then, the bandwidth management unit 102 acquires, from the volume performance information file 142, the use band of each of the volumes 231 included in the adjustment target Tier pool 232. Here, the bandwidth management unit 102 acquires the throughput of the actual measurement performance as the use band.

Then, the bandwidth management unit 102 determines the allocation of the bandwidth with respect to each of the volumes 231 by using Expression (2) below:

$$\text{individual bandwidth} = \alpha \times \text{use bandwidth} + \beta \quad (2)$$

The individual bandwidth mentioned here is the bandwidth allocated to each of the volumes 231. Specifically, the bandwidth management unit 102 determines the individual bandwidth with respect to each of the volumes 231 such that the sum total of the individual bandwidth of each of the volumes 231 becomes equal to the processing capacity of the adjustment target Tier pool 232. Namely, the bandwidth management unit 102 determines the individual bandwidth so as to satisfy Expression 3 below:

$$\text{Tier pool processing capacity of adjustment target} = \text{sum total of individual bandwidths} = \alpha \times \text{sum total of use bandwidths} + \beta \times \text{the number of volumes} \quad (3)$$

Here, it can be said that $\beta$ is the band that is previously allocated when the most recent use bandwidth is zero. Namely, because $\beta$ mentioned here is present, even if an application or the like that uses the adjustment target Tier pool 232 is not started up and the use bandwidth is zero, the allocation band with respect to the adjustment target Tier pool 232 is secured as $\beta$.

At this point, it is conceivable to use a method of determining an individual bandwidth by previously defining $\alpha$ in a setup file or the like and adjusting $\beta$ such that the sum total of the individual bandwidth of each of the volumes 231 becomes the processing capacity of the adjustment target Tier pool 232. In this case, because $\alpha$ is a fixed value, if the number of volumes is increased, $\beta$ is decreased. In this way, if the number of volumes is increased and $\beta$ is decreased, there may be a case in which an application is not able to be started up. Furthermore, in contrast, if the value of $\alpha$ is made small in order to increase the value of $\beta$, a difference between the use bandwidths is less recognized in the individual bandwidth and thus it is difficult to perform allocation in accordance with the use bandwidths. For these reasons, it is difficult to previously determine $\alpha$.

Thus, the bandwidth management unit 102 according to the first embodiment adjusts $\alpha$ by using $\beta$, which is previously defined in a setup file or the like, such that the sum total of the allocation band of each of the volumes 231 becomes equal to the processing capacity of the Tier pool 232. The symbol $\alpha$ mentioned here corresponds to an example of a "coefficient".

Here, in the embodiment, the bandwidth management unit 102 uses, as $\beta$, the minimum bandwidth (hereinafter, referred to as the "minimum guarantee bandwidth") that is used for a startup of a business application. Consequently, the storage device 2 can be provided in a case in which data transfer often occurs in, for example, an initialization process in a startup process of the business application.

Namely, the bandwidth management unit 102 calculates $\alpha$ from Expression 3 by using the maximum transfer capacity of the adjustment target Tier pool 232 received from the maximum performance calculating unit 101 and by using the previously determined value of $\beta$. Then, the bandwidth management unit 102 calculates, by using the calculated $\alpha$ and the previously determined $\beta$, the individual bandwidths that are allocated to the respective volumes 231.

Then, the bandwidth management unit 102 creates a setting command that instructs to set each of the calculated individual bandwidths to each of the corresponding volumes 231 included in the adjustment target Tier pool 232. Then, the bandwidth management unit 102 sends the created setting command to the bandwidth control unit 252.

In this way, if the number of volumes is small, the bandwidth management unit 102 increases the value of $\alpha$ and appropriately implements the allocation of the bandwidths in accordance with the use bandwidths. In contrast, if the number of volumes is great, because the band used for the allocation becomes insufficient, the bandwidth management unit 102 performs the adjustment such that the value of $\alpha$ is small. The bandwidth management unit 102 mentioned here corresponds to an example of an "allocating unit".

The functions of the maximum performance calculating unit 101, the bandwidth management unit 102, and the monitoring unit 103 are implemented by, for example, the CPU 13 and the memory 12 illustrated in FIG. 2. For example, various kinds of programs that are used to implement the functions performed by the maximum performance calculating unit 101, the bandwidth management unit 102, and the monitoring unit 103 are stored in the HDD 14. Then, the CPU 13 reads the various kinds of programs from the HDD 14; loads the processes that implement the functions performed by the maximum performance calculating unit 101, the bandwidth management unit 102, and the monitoring unit 103 in the memory 12; and then executes the processes.

The performance information acquiring unit 251 receives an instruction to start the performance collection from the monitoring unit 103. Then, the performance information acquiring unit 251 periodically acquires the performance information on each of the volumes 231, the performance information on each of the Tier pools 232, and the Busy rate of each of the disks 203 and sends the acquired information and the Busy rate to the monitoring unit 103.

The bandwidth control unit 252 receives, from the bandwidth management unit 102, the setting command that is used to instruct the setting of the bandwidth with respect to each of the volumes 231 included in the adjustment target Tier pool 232. Then, the bandwidth control unit 252 sets, in accordance with the specified setting command, the bandwidth of each of the volumes 231 specified by the setting command.

Figure 7:
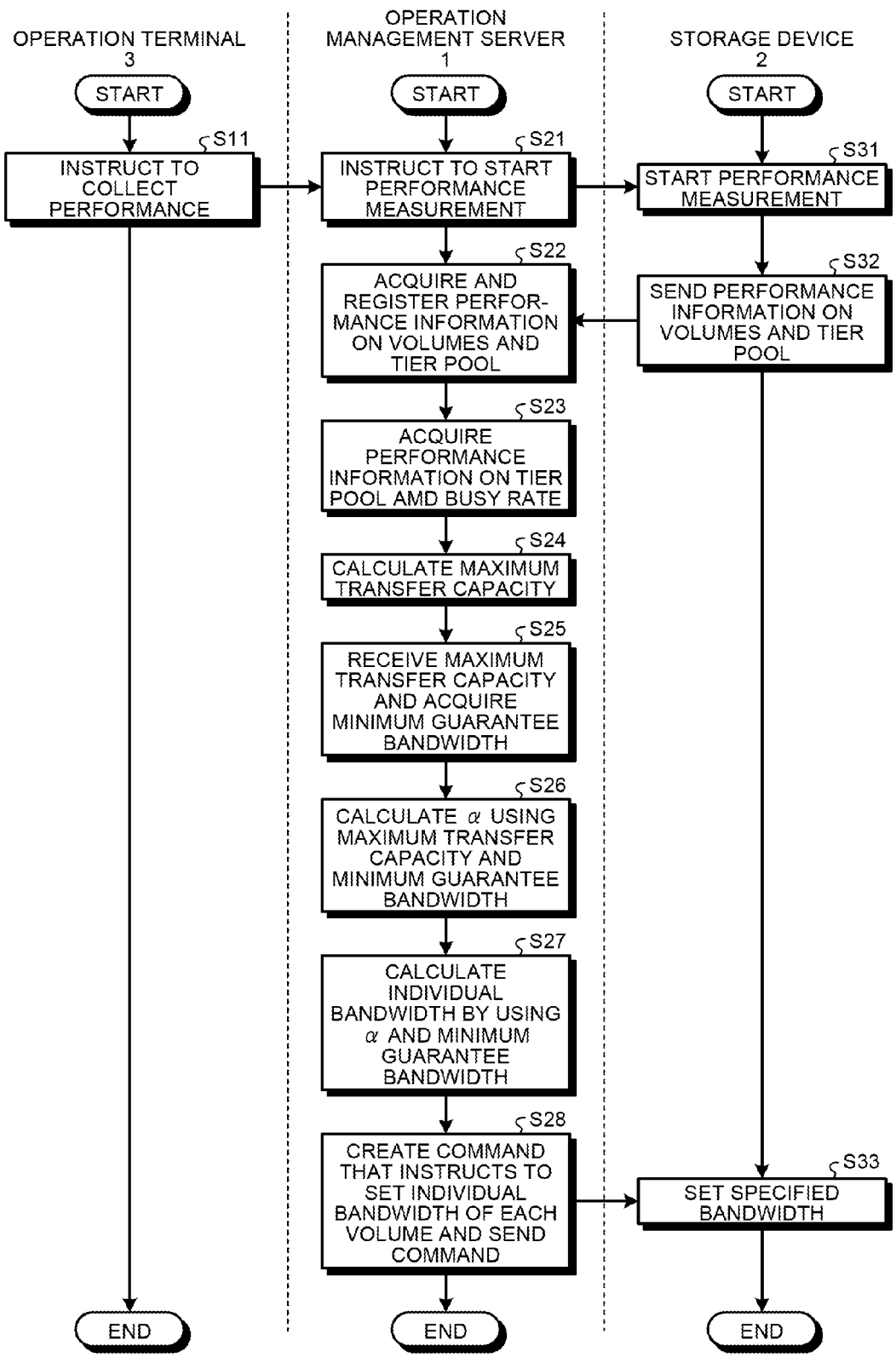
FIG. 7 is a flowchart illustrating bandwidth control in the storage system according to the first embodiment.

In the following, the flow of bandwidth control performed in the storage system according to the first embodiment will be described with reference to FIG. 7. FIG. 7 is a flowchart illustrating bandwidth control in the storage system according to the first embodiment. The flow on the left side illustrated in FIG. 7 indicates the process performed by the operation terminal 3. Furthermore, the flow in the middle illustrated in FIG. 7 indicates the process performed by the operation management server 1. Furthermore, the flow on the right side illustrated in FIG. 7 indicates the process performed by the storage device 2. Furthermore, the arrow that connects each of the flows indicates that an instruction or data is sent in the direction of the arrow.

In response to an instruction from an operator, the operation terminal 3 instructs the monitoring unit 103 in the operation management server 1 to perform the performance collection (Step S11). Consequently, in the operation management server 1 and the storage device 2, the performance collection of the storage device 2 is started and the adjustment of the bandwidths is performed.

In the following, a process performed by the operation management server 1 will be described. The monitoring unit 103 receives, from the operation terminal 3, an instruction to start the performance measurement. Then, the monitoring unit 103 instructs the performance information acquiring unit 251 in the storage device 2 to start the performance measurement (Step S21).

The monitoring unit 103 acquires the performance information on the volumes 231 and the Tier pool 232 and acquires the Busy rate of each of the disks 203. Then, the monitoring unit 103 calculates a Busy rate of the Tier pool 232 from the Busy rate of each of the disks 203. Then, the monitoring unit 103 registers the performance information on the volumes 231 in the volume performance information file 142 and registers the performance information and the Busy rate on the Tier pool 232 in the Tier performance information file 143 (Step S22).

The maximum performance calculating unit 101 acquires the actual measurement throughput and the Busy rate of the adjustment target Tier pool 232 from the Tier performance information file 143 (Step S23).

Then, by using the acquired actual measurement throughput and the Busy rate, the maximum performance calculating unit 101 calculates the maximum transfer capacity of the adjustment target Tier pool 232 (Step S24). Thereafter, the maximum performance calculating unit 101 sends information on the maximum transfer capacity of the adjustment target Tier pool 232 to the bandwidth management unit 102.

The bandwidth management unit 102 determines, from the setup file held by the bandwidth management unit 102, whether IOPS or the throughput is used for the index of allocation. The bandwidth management unit 102 receives information on the maximum transfer capacity of the adjustment target Tier pool 232 from the maximum performance calculating unit 101. Furthermore, the bandwidth management unit 102 acquires the value of $\beta$ that is the minimum guarantee bandwidth of the volume 231 (Step S25). Furthermore, the bandwidth management unit 102 acquires the use bandwidth of each of the volumes 231 included in the adjustment target Tier pool 232.

Then, the bandwidth management unit 102 calculates $\alpha$ from Expression 3 by using the use bandwidth, the maximum transfer capacity of the adjustment target Tier pool 232, and $\beta$ that is the minimum guarantee bandwidth (Step S26).

Then, the bandwidth management unit 102 calculates the individual bandwidth of each of the volumes 231 from Expression 2 by using the use bandwidth, the calculated $\alpha$, and the acquired $\beta$ (Step S27).

Then, the bandwidth management unit 102 creates a setting command that instructs to set each of the individual bandwidths of each of the volumes 231 included in the adjustment target Tier pool 232. Thereafter, the bandwidth management unit 102 sends the created setting command to the bandwidth control unit 252 (Step S28).

In the following, the process performed by the storage device 2 will be described. The performance information acquiring unit 251 receives an instruction to start the performance measurement from the monitoring unit 103 in the operation management server 1. Then, the performance information acquiring unit 251 starts to measure the performance information on each of the volumes 231 and each of the Tier pools 232 and measures the Busy rate of the disk 203 (Step S31).

Thereafter, the performance information acquiring unit 251 sends the acquired performance information on each of the volumes 231 and each of the Tier pools 232 and sends the Busy rate of the disk 203 to the bandwidth management unit 102 in the operation management server 1 (Step S32).

Then, in response to the setting command received from the bandwidth management unit 102 in the operation management server 1, the bandwidth control unit 252 sets the bandwidth specified with respect to each of the volumes 231 (Step S33).

As described above, the operation management server according to the first embodiment determines, by using a previously determined minimum guarantee band, from the maximum transfer capacity of the adjustment target Tier pool, the bandwidth that is allocated to all of the volumes included in the adjustment target Tier pool. Consequently, it is possible to allocate the bandwidth while reducing the performance interference among the volumes included in the Tier pool. Furthermore, because the band that is used to start up an application or the like is secured, it is possible to smoothly perform a startup. Furthermore, because there is no need to specify the bandwidth to each of the volumes, the administrator's work can be reduced. In addition, there is no need to previously determine the value of $\alpha$, the administrator's work can be reduced.

Furthermore, the description in the above, the throughput is used as an example; however, as described above, an individual bandwidth may also be calculated by using the IOPS as the actual measurement performance. However, if IOPS is used, it is preferable to convert IOPS to the throughput by using an amount of data that serves as a reference and compare the throughput with the maximum transfer capacity.

[b] Second Embodiment

Figure 8:
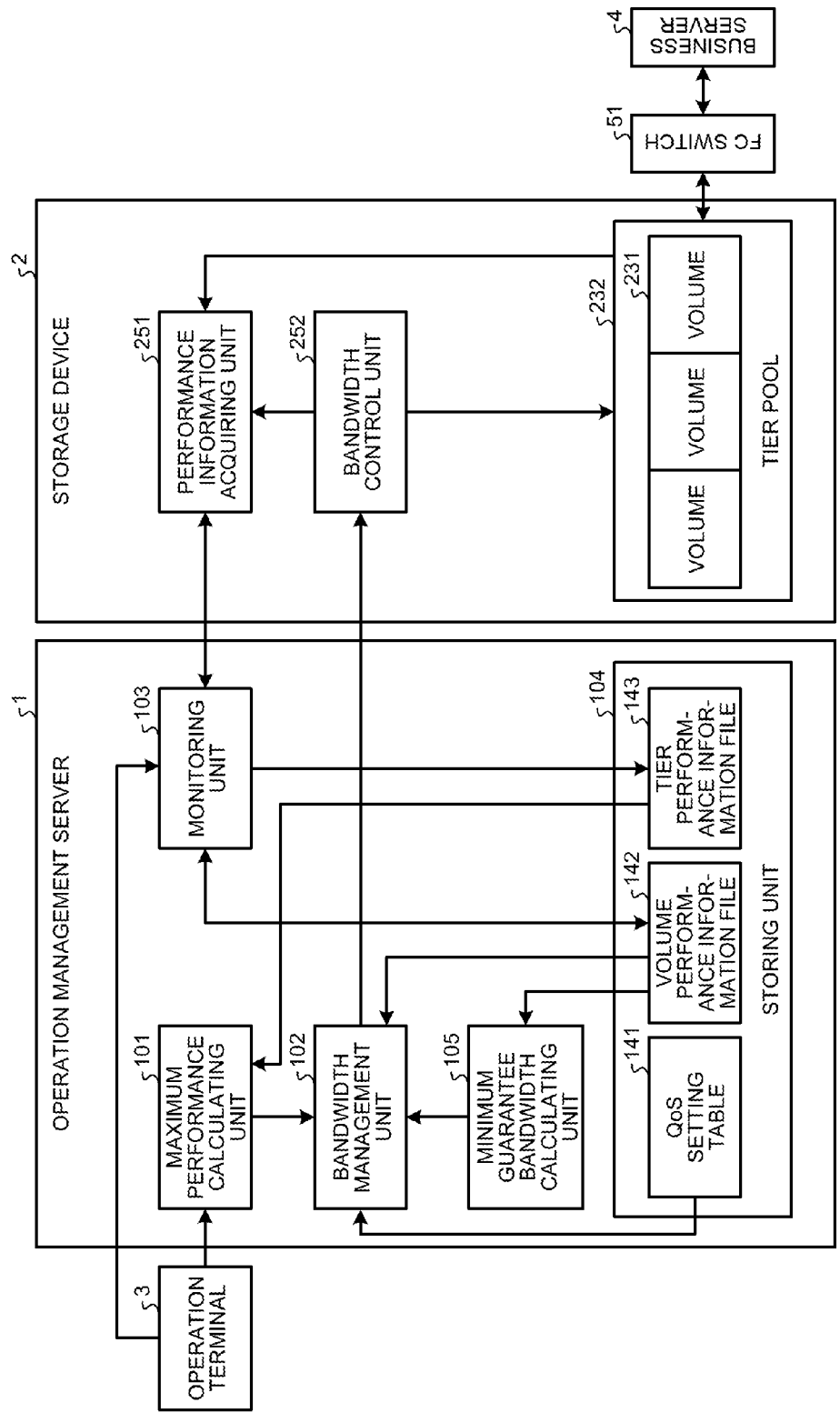
FIG. 8 is a block diagram illustrating an operation management server and a storage device according to a second embodiment.

FIG. 8 is a block diagram illustrating an operation management server and a storage device according to a second embodiment. In the operation management server according to the second embodiment, a minimum guarantee bandwidth calculating unit 105 is added to the units described in the first embodiment. The operation management server according to the second embodiment differs from the first embodiment in that the minimum guarantee bandwidth of each of the volumes is automatically calculated and is set. Thus, calculation of the minimum guarantee bandwidth will be mainly described. In the description below, it is assumed that components having the same function as that performed in the first embodiment have the same function unless otherwise noted.

The minimum guarantee bandwidth calculating unit 105 previously holds the initial value of the minimum guarantee bandwidth of each of the volumes 231. Then, if the measurement of the performance of each of the volumes 231 has not been started, the minimum guarantee bandwidth calculating unit 105 outputs the initial value of the minimum guarantee bandwidth of each of the volumes 231 to the bandwidth management unit 102 as the use bandwidth at the time of startup.

Then, the minimum guarantee bandwidth calculating unit 105 monitors the IOPS of the actual measurement performance in the volume performance information file 142. Then, if, after the state in which the IOPS is zero continues for a first time, the state in which the IOPS is greater than zero continues for a second time or more, the minimum guarantee bandwidth calculating unit 105 determines that an application has started up in the subject volume 231. Here, the first time and the second time are defined by the setup file. Furthermore, the first time and the second time may also be the same value or may also be a different value and are preferably determined by the operational environment or the like. Consequently, it is possible to exclude the state that is other than the startup, such as a case in which the IOPS instantaneously becomes zero, a case in which the IOPS instantaneously occurs in the state in which the application is not started up due to another reason, or the like.

If the minimum guarantee bandwidth calculating unit 105 determines that the application has been started up, the minimum guarantee bandwidth calculating unit 105 acquires the use bandwidth of the volume 231 in which the application is started up. In the second embodiment, the minimum guarantee bandwidth calculating unit 105 acquires the throughput of the actual measurement performance from the volume performance information file 142. Then, the minimum guarantee bandwidth calculating unit 105 outputs the acquired use bandwidth as the use bandwidth at the time of startup to the bandwidth management unit 102 together with the identification information on the associated volume 231.

However, in the second embodiment, the minimum guarantee bandwidth calculating unit 105 uses the use bandwidth measured at the time of the most recent startup as the use bandwidth at the time of startup; however, the use bandwidth is not limited to this. For example, the minimum guarantee bandwidth calculating unit 105 may also use the average of the use bandwidths at the time of the most recent number of times or days or may also uses the maximum value as the use bandwidth at the time of startup. In this case, it is preferable that the minimum guarantee bandwidth calculating unit 105 store therein the use bandwidth at the time of the past startup. Furthermore, the information for selecting one of options between the number of times and days or one of options between the average and the maximum value is preferably set in, for example, the setup file included in the minimum guarantee bandwidth calculating unit 105.

Furthermore, the minimum guarantee bandwidth calculating unit 105 may also use, as the use bandwidth at the time of startup, the value obtained by multiplying the coefficient $\gamma$ ($0<\gamma<1$) by the use bandwidth acquired from the actual measurement. Consequently, although the startup time becomes long by a certain time period, the band can be allocated to further greater number of volumes 231.

The bandwidth management unit 102 receives an input of the minimum guarantee bandwidth of each of the volumes 231 at the time of startup from the minimum guarantee bandwidth calculating unit 105. In the state in which the minimum guarantee bandwidth calculating unit 105 acquires the minimum guarantee bandwidth of the certain volume 231 at the time of startup, if the bandwidth management unit 102 receives an input of the minimum guarantee bandwidth of the subject volume 231, the minimum guarantee bandwidth calculating unit 105 updates the minimum guarantee bandwidth of the subject volume 231 at the time of startup to the data that is acquired later. The minimum guarantee bandwidth of each of the volumes 231 at the time of startup mentioned here corresponds to the minimum guarantee bandwidth of each of the volumes 231.

In the following, calculation of $\alpha$ performed by the bandwidth management unit 102 will be described in detail. The minimum guarantee bandwidth and $\alpha$ of each of the volumes 231 at the time of startup satisfies Expression 4 below if $\beta_k$ is defined as the minimum guarantee bandwidth of the $k^{th}$ volume 231.

$$B_{MAX} = \sum_{k=1}^{N} B'_k = \sum_{k=1}^{N} (\alpha B_k + \beta_k) = \alpha \sum_{k=1}^{N} B_k + \sum_{k=1}^{N} \beta_k \quad (4)$$

where, N represents the number of volumes. Furthermore, $B_k$ represents the use bandwidth of the $k^{th}$ volume. Furthermore, $B'_k$ represents the individual bandwidth allocated to the $k^{th}$ volume.

When Expression 4 is solved for $\alpha$, $\alpha$ is represented by Expression 5 below:

$$\alpha = \frac{B_{MAX} - \sum_{k=1}^{N} \beta_k}{\sum_{k=1}^{N} B_k} \quad (5)$$

However, in Expression 5, if the sum total of the minimum guarantee bandwidth approaches the maximum capacity of the Tier pool, the value of $\alpha$ approaches zero. At this point, in Expression 2, if the use bandwidth to be calculated is greater than zero and is equal to or less than the sum total of the minimum guarantee bandwidths, i.e., $0 \le \text{use band} < \beta$, the band with a value that exceeds $\beta$ is allocated to the individual bandwidth. Thus, if an adjustment is performed such that the individual bandwidth is not increased until the use band matches the minimum guarantee bandwidth, $\alpha$ is represented by Expression 6 below:

$$\alpha = \frac{B_{MAX} - \sum_{k=1}^{N} \beta_k}{\sum_{k=1}^{N} (B_k - \beta_k)} \quad (6)$$

where, if $B_k - \beta_k < 0$, $B_k - \beta_k = 0$ is obtained. Furthermore, if the sum total of the denominator is zero, i.e., if the use band is smaller than the minimum guarantee bandwidth in all of the volumes 231, $\alpha = 0$ is obtained.

Furthermore, there may be a case in which, in Expression 6, $\alpha$ exceeds 1. It is conceivable that the state in which $\alpha$ exceeds 1 indicates that the bandwidth that is greater than the actual use bandwidth is allocated to each of the volumes 231. In this case, the state indicates that the actual use bandwidth of each of the volumes 231 is small and the processing capacity of the Tier pool 232 is sufficient. However, it is also conceivable that allocating the bandwidth that is greater than the actual use band is wasted. Thus, in the second embodiment, if $\alpha$ exceeds 1, Expression 6 is adjusted such that $\alpha$ is 1. Namely, $\alpha$ can be represented by Expression 7 below:

$$\begin{cases} \alpha = \dfrac{B_{MAX} - \sum_{k=1}^{N} \beta_k}{\sum_{k=1}^{N} (B_k - \beta_k)} & \left(\text{in case of } B_{MAX} \le \sum_{k=1}^{N} (B_k - \beta_k) + \sum_{k=1}^{N} \beta_k\right) \\ \alpha = 1 & \left(\text{in case of } B_{MAX} > \sum_{k=1}^{N} (B_k - \beta_k) + \sum_{k=1}^{N} \beta_k\right) \end{cases} \quad (7)$$

where, if $B_k - \beta_k < 0$, $B_k - \beta_k = 0$ is obtained. Furthermore, if the sum total of the denominator is 0, i.e., if the use band is smaller than the minimum guarantee bandwidth in all of the volumes 231, $\alpha = 0$ is obtained.

As described above, the operation management server according to the second embodiment determines the minimum guarantee bandwidth in accordance with the actual use bandwidth. Consequently, the use bandwidth is determined in accordance with the method of using each of the volumes and thus the use bandwidth can be determined in accordance with the business performed by the application that uses the volume 231. Namely, it is possible to automatically determine the individual bandwidth in accordance with the business and to implement more appropriate allocation of the bandwidth.

First Modification

The bandwidth management unit 102 specifies the volume 231 in which the process performance is insufficient and the volume 231 in which the process performance is sufficient. For example, the bandwidth management unit 102 specifies, from a delay time of the volume performance information file 142 or the like, the volume 231 in which the process performance is continuously insufficient in a predetermined time period as the volume 231 with the insufficient process performance. Furthermore, the bandwidth management unit 102 specifies, from a delay time of the volume performance information file 142 or the like, the volume 231 in which the process performance is continuously sufficient in a predetermined time period as the volume 231 with the sufficient process performance.

Then, the bandwidth management unit 102 lends the process performance of the volume 231 in which the process performance is sufficient to the volume 231 in which the process performance is insufficient. Namely, the bandwidth management unit 102 additionally allocates the bandwidth to each of the volumes 231. For example, the bandwidth management unit 102 calculates, in accordance with the previously determined priority with respect to each of the volumes 231, an additional bandwidth that is additionally allocated to each of the volumes 231. Furthermore, as another method, the bandwidth management unit 102 divides the process performance of the volume 231 in which the process performance is sufficient by the number of volumes and calculates an additional bandwidth that is additionally allocated to each of the volumes 231.

Then, the bandwidth management unit 102 notifies the bandwidth control unit 252 of the lending of the bandwidth from the volume 231 with the sufficient process performance to the volume 231 with the insufficient process performance.

The bandwidth control unit 252 receives the notification, from the bandwidth management unit 102, of the lending of the bandwidth from the volume 231 with the sufficient process performance to the volume 231 with the insufficient process performance. Then, the bandwidth control unit 252 reduces the bandwidth of the volume 231 with the sufficient process performance and extends the bandwidth of the volume 231 with the insufficient process performance. In the description below, the function of lending the bandwidth is referred to as an "extended flexibility function". This extended flexibility function is implemented by, for example, the QoS of the storage device 2.

In this way, because the extended flexibility function is used after allocating the bandwidths, it is possible to further improve the use efficiency of the bandwidths.

Second Modification

In the description above, the minimum guarantee bandwidth is determined such that, in the situation in which a load is rapidly increased, the allocation of the bandwidth is maintained in order to cope with the situation in which an application is started up. However, other than this, there is also the situation in which a load is increased. Thus, in order to cope with another situation, it is also possible to use the average use bandwidth of the volumes 231 or the average use bandwidth of all of the volumes 231 as the minimum guarantee bandwidth. Furthermore, it is determined, in accordance with the situation in which the load is increased, which one of the options is used as the minimum guarantee bandwidth and the bandwidth management unit 102 may also calculate, when the subject situation occurs, an individual bandwidth of each of the volumes 231 by using the determined minimum guarantee bandwidth. Furthermore, by considering the safety, it is also possible to construct the configuration in which the bandwidth management unit 102 uses, from among a plurality of candidates for the minimum guarantee bandwidths, the minimum guarantee bandwidth with the maximum value as the minimum guarantee bandwidth.

In this way, by changing the minimum guarantee bandwidth in accordance with the situation of an increase in the load, it is possible to allocate the bandwidth in accordance with the use state of each of the volumes and further improve the use efficiency of the bandwidth.

[c] Third Embodiment

In the following, a third embodiment will be described. An operation management server according to the third embodiment makes the individual bandwidths targeted for the allocation differ in accordance with the performance level that is specified by an operator. In the following, a description will be given of a case in which a new function is added to the second embodiment. The operation management server according to the third embodiment is also represented by the block diagram illustrated in FIG. 8. In the description below, it is assumed that components having the same function as that performed in the second embodiment have the same function unless otherwise noted. However, the function described in the third embodiment may also be added to the configuration in the first embodiment.

The operator inputs, by using the operation terminal 3, the performance level that is set to each of the volumes 231. The performance level mentioned here is the index that is used to adjust whether the performance of each of the volumes 231 are made to increase or decrease. For example, it is assumed that, in the third embodiment, the performance level is represented by three stages, i.e., the high performance, the medium performance, and the low performance.

The bandwidth management unit 102 stores therein the band ratio of $\alpha$ (hereinafter, referred to as an "operation time band ratio") and the band ratio of $\beta$ (hereinafter, referred to as a "startup time band ratio") in Expression 7. In the following, the setting of each of the band ratios will be described.

It is conceivable that the use bandwidth at the time of startup is not changed much. In contrast, it is conceivable that the use bandwidth is gradually changed due to an update, fragmentation, or the like; however, it is also conceivable that these do not bring a great change. Namely, the use bandwidths at the time of startup obtained from the actual measurement do not have big difference. Thus, if $\beta=1$, it can be said that the value can exhibit the maximum performance of the volumes 231. Accordingly, when a startup is considered as the reference, if the performance level is high, the startup time band ratio is 1; if the performance level is medium, the startup time band ratio becomes a value smaller than 1; and, if the performance level is low, a value smaller than that of the performance level can be taken. For example, the bandwidth management unit 102 stores therein the startup time band ratio as the ratio of high performance:medium performance:low performance=1:0.75:0.5.

In contrast, at the time other than startup, it is difficult to estimate the size of the bandwidth that will be used at the following time point because the variation of the use bandwidth is great. Thus, if the performance level is high, because the bandwidth that is greater than the most recent use bandwidth is allocated, it is preferable to set, for the operation time band ratio, the performance ratio that exceeds 1. For the operation time band ratio, if the performance level is high, a value greater than 1 can be set; if the performance level is medium, 1 can be set; and, if the performance level is low, a value smaller than 1 can be set. For example, the bandwidth management unit 102 stores therein the operation time band ratio as the ratio of high performance:medium performance:low performance=2:1:0.5.

Then, if the operation time band ratio and the startup time band ratio are used, the individual band ratio allocated to each of the volumes can be represented by Expression 8 below:

allocation band=α×operation time band ratio×(use bandwidth−startup time band ratio×β)+startup time band ratio×β (8)

Here, if use bandwidth−startup time band ratio×β<0, the term represented by use bandwidth−startup time band ratio×β is set to 0.

Then, because the use bandwidth of each of the volumes 231 is determined such that the sum total of the use bandwidths is equal to the maximum processing capacity of the Tier pool 232, Expression 9 below is satisfied.

$$B_{MAX} = \sum_{k=1}^{N} B'_k = \sum_{k=1}^{N} \{\alpha W_k(B_k + X_k\beta_k) + X_k\beta_k\} = \alpha \sum_{k=1}^{N} W_k(B_k - X_k\beta_k) + \sum_{k=1}^{N} X_k\beta_k \quad (9)$$

where, $W_k$ is the operation time band ratio of the $k^{th}$ volume and $X_k$ is the startup time band ratio of the $k^{th}$ volume. By solving Expression 9 for α, α is represented by Expression 10 below:

$$\alpha = \frac{B_{MAX} - \sum_{k=1}^{N} X_k\beta_k}{\sum_{k=1}^{N} W_k(B_k - X_k\beta_k)} \quad (10)$$

Accordingly, the bandwidth management unit 102 according to the third embodiment uses Expression 11 below to calculate an individual bandwidth of each of the volumes 231. Expression 11 represents the individual bandwidth of the $i^{th}$ (1≤i≤the number of volumes) volume 231.

$$B'_i = \frac{B_{MAX} - \sum_{k=1}^{N} X_k\beta_k}{\sum_{k=1}^{N} W_k(B_k - X_k\beta_k)} W_i(B_i - X_i\beta_i) + X_i\beta_i \quad (11)$$

where, $B_i$ represents the use bandwidth of the $i^{th}$ volume. Furthermore, $B'_i$ represents the individual bandwidth that is allocated to the $i^{th}$ volume. At this point, if a state is $B_k - X_k\beta_k < 0$, the term represented by $B_k - X_k\beta_k$ is set to 0. Furthermore, if the denominator is 0, the portion of the fraction is set to 0.

Furthermore, in also Expression 11, there may be a case in which α exceeds 1. As described above, it is conceivable that the state in which α exceeds 1 indicates that the bandwidth that is greater than the actual use bandwidth is allocated to the volume 231. Thus, in the third embodiment, if α exceeds 1, Expression 11 is adjusted such that α becomes 1. In this case, α is represented by Expression 12 below:

$$B_{MAX} > \sum_{k=1}^{N} W_k(B_k - X_k\beta_k) + \sum_{k=1}^{N} X_k\beta_k \quad (12)$$

$$\begin{cases} \alpha = \dfrac{B_{MAX} - \sum_{k=1}^{N} X_k\beta_k}{\sum_{k=1}^{N} W_k(B_k - X_k\beta_k)} & \left(\text{in case of } B_{MAX} > \sum_{k=1}^{N} W_k(B_k - X_k\beta_k) + \sum_{k=1}^{N} X_k\beta_k\right) \\ \alpha = 1 & \left(\text{in case of } B_{MAX} \leq \sum_{k=1}^{N} W_k(B_k - X_k\beta_k) + \sum_{k=1}^{N} X_k\beta_k\right) \end{cases}$$

At this point, in also Expression 12, if $B_k - X_k\beta_k < 0$, the term represented by $B_k - X_k\beta_k$ is 0. The bandwidth management unit 102 calculates an individual bandwidth by using α represented by Expression 12 for Expression 11. In this way, calculating a bandwidth that is in accordance with the performance level by using both the operation time band ratio and the startup time band ratio corresponds to an example of "weighting".

In this way, by setting the individual bandwidth in accordance with the performance level of "high, medium, and low", the following advantages can be obtained for the volumes 231 having the associated performance levels.

For the volume 231 with the high performance level, the bandwidth that exceeds the immediately previous use bandwidth is allocated. Consequently, even if the situation in which the load is increased, i.e., even if the state in which the load greater than that of the immediately previous use bandwidth occurs, because a sufficient band is allocated to the volume 231 with the high performance level, the bandwidth does not lack in the business application running on the subject volume 231. Thus, because important business is performed, the volume 231 in which the performance level is set to high can satisfy a specified request.

Furthermore, for the volume 231 with the medium performance level, the bandwidth that is equal to the immediately previous use bandwidth is allocated. At this point, if the extended flexibility function described in the first modification in the second embodiment is used, if an amount of the use bandwidth of the other volume 231 is small and the bandwidth is sufficient, an additional band is allocated to the subject volume 231. Consequently, in the situation in which the load is increased, with the support of the extended flexibility function, the volume 231 with the medium performance level can avoid a lack of bandwidth.

In contrast, for the volume 231 with the low performance level, the bandwidth that is smaller than the immediately previous use bandwidth is allocated. Then, if a sufficient level of the bandwidth is high, the bandwidth that is greater than the immediately previous use bandwidth is allocated to the subject volume 231.

To summarize the above, for the volume 231 with the high performance level, even if the situation in which the load is increased, a sufficient band is allocated. In this case, for the volume 231 with the low performance level, the individual bandwidth is squeezed by the bandwidth that is allocated to the volume 231 with the high performance level. In contrast, for the volume 231 with the low performance level, in the situation in which the load is increased, a sufficient bandwidth is allocated only when the use bandwidth of the other volumes 231 is very low.

As described above, the operation management server according to the third embodiment determines the bandwidth allocated to each of the volumes in accordance with the specified performance level. Consequently, it is possible to secure the bandwidth in accordance with the importance of the applications that use the respective volumes, to implement the allocation of appropriate bandwidths in accordance with each of the volumes, and to further improve the use efficiency of the bandwidths.

[d] Fourth Embodiment

In the following, a fourth embodiment will be described. An operation management server according to the fourth embodiment differs from the third embodiment in that the operation time band ratio and the startup time band ratio are varied in accordance with the use state of the Tier pool. The operation management server according to the fourth embodiment is also represented by the block diagram illustrated in FIG. 8. In the description below, it is assumed that components having the same function as that performed in the third embodiment have the same function unless otherwise noted.

The bandwidth management unit 102 according to the fourth embodiment includes two pairs of a pair of the operation time band ratio and the startup time band ratio having different values (hereinafter, the pair thereof is simply correctively referred to as a "band ratio pair"). Furthermore, the bandwidth management unit 102 uses one of the stored two pairs of band ratio pair as a standard bandwidth ratio pair.

For example, a description will be given of a case in which the bandwidth management unit 102 stores, as a band ratio pair other than the standard bandwidth ratio pair, a band ratio pair in the case where the bandwidth is sufficient. Here, the band ratio pair in the case where the bandwidth is sufficient is referred to as an "off-time band ratio pair". The bandwidth management unit 102 stores therein the standard bandwidth ratio pair in which the operation time band ratio is 2:1:0.5 and the startup time band ratio is 1:0.75:0.5. Furthermore, the bandwidth management unit 102 stores therein the off-time band ratio pair in which the operation time band ratio is 2:1:1 and the startup time band ratio is 1:1:1.

After the bandwidth management unit 102 acquires the maximum transfer capacity of the Tier pool 232, first, the bandwidth management unit 102 calculates an individual bandwidth of each of the volumes 231 by using the standard bandwidth ratio pair for Expression 11. Then, the bandwidth management unit 102 determines whether the individual bandwidth of each of the volumes 231 calculated by using the standard bandwidth ratio pair satisfies Expression 13 below:

$$B_{MAX} > \sum_{k=1}^{N} W_k(B_k - X_k\beta_k) + \sum_{k=1}^{N} X_k\beta_k \qquad (13)$$

If Expression 13 is not satisfied, the bandwidth management unit 102 notifies the bandwidth control unit 252 of the individual bandwidth of each of the volumes 231 calculated by using the standard bandwidth ratio pair.

In contrast, if Expression 13 is satisfied, the bandwidth management unit 102 calculates an individual bandwidth of each of the volumes 231 by using the off-time band ratio pair for Expression 12. Then, the bandwidth management unit 102 determines whether the individual bandwidth of each of the volumes 231 calculated by using the off-time band ratio pair satisfies Expression 14 below:

$$B_{MAX} \geq \sum_{k=1}^{N} W_k(B_k - X_k\beta_k) + \sum_{k=1}^{N} X_k\beta_k \qquad (14)$$

If Expression 14 is satisfied, the bandwidth management unit 102 notifies the bandwidth control unit 252 of the individual bandwidth of each of the volumes 231 calculated by using the off-time band ratio pair. In contrast, if Expression 14 is not satisfied, the bandwidth management unit 102 notifies the bandwidth control unit 252 of the individual bandwidth of each of the volumes 231 calculated by using the standard bandwidth ratio pair.

Figure 9:
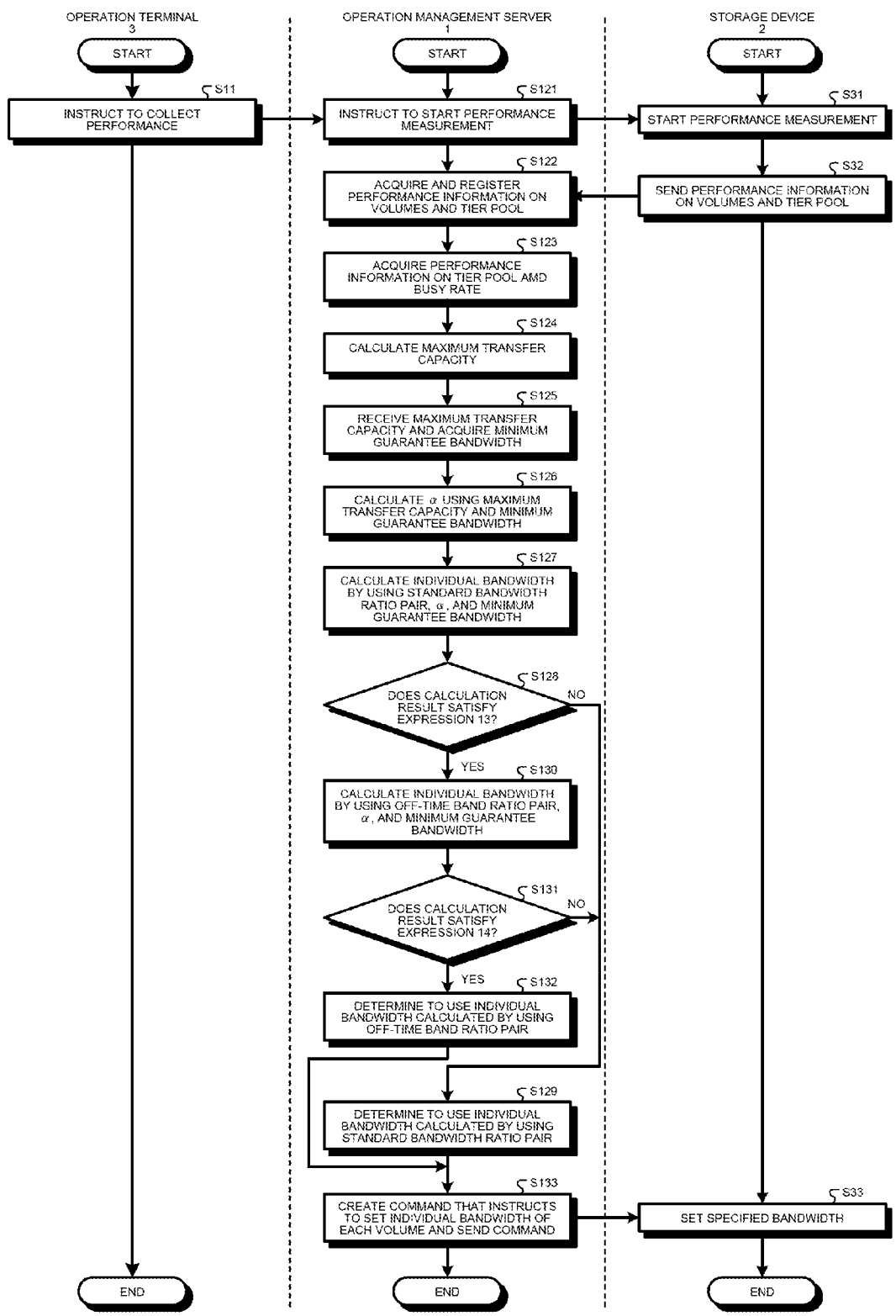
FIG. 9 is a flowchart illustrating bandwidth control in a storage system according to a fourth embodiment.

In the following, the flow of bandwidth control performed in the storage system according to the fourth embodiment will be described with reference to FIG. 9. FIG. 9 is a flowchart illustrating bandwidth control in a storage system according to a fourth embodiment. Because the operations of the operation terminal 3 and the storage device 2 are the same as those described in the first embodiment, in the following, only the operation management server 1 will be described.

The monitoring unit 103 receives an instruction to start the performance measurement from the operation terminal 3. Then, the monitoring unit 103 instructs the performance information acquiring unit 251 in the storage device 2 to start the performance measurement (Step S121).

The monitoring unit 103 acquires the performance information on the volumes 231 and the Tier pool 232 and acquires the Busy rate of the disks 203. Then, the monitoring unit 103 calculates a Busy rate of the Tier pool 232 from the Busy rate of the disks 203. Then, the monitoring unit 103 registers the performance information on the volumes 231 in the volume performance information file 142 and registers the performance information and the Busy rate of the Tier pool 232 in the Tier performance information file 143 (Step S122).

The maximum performance calculating unit 101 acquires the actual measurement throughput and the Busy rate of the adjustment target Tier pool 232 from the Tier performance information file 143 (Step S123).

Then, the maximum performance calculating unit 101 calculates the maximum transfer capacity of the adjustment target Tier pool 232 by using the acquired actual measurement throughput and the Busy rate (Step S124). Thereafter, the maximum performance calculating unit 101 sends the information on the maximum transfer capacity of the adjustment target Tier pool 232 to the bandwidth management unit 102.

The bandwidth management unit 102 acquires, from the setup file held by the bandwidth management unit 102, IOPS or the throughput that is used for the index of the allocation. The bandwidth management unit 102 receives the information on the maximum transfer capacity of the adjustment target Tier pool 232 from the maximum performance calculating unit 101. Furthermore, the bandwidth management unit 102 acquires the value of $\beta$ that is the minimum guarantee bandwidth of the volumes 231 (Step S125). Furthermore, the bandwidth management unit 102 acquires the use bandwidth of the volumes 231 included in the adjustment target Tier pool 232.

Then, by using the use bandwidth, the maximum transfer capacity of the adjustment target Tier pool 232 and, $\beta$ that is the minimum guarantee bandwidth, the bandwidth management unit 102 calculates $\alpha$ from Expression 3 (Step S126).

Then, by using the standard bandwidth ratio pair, the use bandwidth, the calculated $\alpha$, and the acquired $\beta$, the bandwidth management unit 102 calculates an individual bandwidth of each of the volumes 231 from Expression 2 (Step S127).

Then, the bandwidth management unit 102 determines whether the calculation result satisfies Expression 13 (Step S128). If Expression 13 is not satisfied (No at Step S128), the bandwidth management unit 102 determines to use the individual bandwidth calculated by using the standard bandwidth ratio pair (Step S129).

In contrast, if Expression 13 is satisfied (Yes at Step S128), by using the off-time band ratio pair, the use bandwidth, the calculated $\alpha$, and the acquired $\beta$, the bandwidth management unit 102 calculates an individual bandwidth of each of the volumes 231 from Expression 2 (Step S130).

Then, the bandwidth management unit 102 determines whether the calculation result satisfies Expression 14 (Step S131). If Expression 14 is not satisfied (No at Step S131), the bandwidth management unit 102 proceeds to Step S129.

In contrast, if Expression 14 is satisfied (Yes at Step S131), the bandwidth management unit 102 determines to use the individual bandwidth that is calculated by using the off-time band ratio pair (Step S132).

Then, the bandwidth management unit 102 creates a setting command that instructs the setting of each of the individual bandwidths with respect to each of the volumes 231 included in the adjustment target Tier pool 232. Thereafter, the bandwidth management unit 102 sends the created setting command to the bandwidth control unit 252 (Step S133).

As described above, the operation management server according to the fourth embodiment includes a plurality of the band ratio pairs and calculates an individual bandwidth by using the band ratio pair in accordance with the use state of the Tier pool 232. Consequently, it is possible to improve the use efficiency of the bandwidth.

Furthermore, in the above, a description has been given of a case in which two band ratio pairs are used; however, the number of band ratio pairs may also be three or more. For example, the bandwidth management unit 102 stores therein the standard bandwidth ratio pair in which the operation time band ratio is 2:1:0.5 and the startup time band ratio is 1:0.75:0.5. Furthermore, the bandwidth management unit 102 stores therein the off-time band ratio pair in which the operation time band ratio is 2:1:0.75 and the startup time band ratio is 1:0.875:0.75. Furthermore, the bandwidth management unit 102 stores therein the super off-time band ratio pair in which the operation time band ratio is 2:1:1 and the startup time band ratio is 1:1:1. In this case, a difference between the performance levels in the band ratio pair is gradually decreased. Then, the bandwidth management unit 102 specifies the band ratio pair in which Expression 14 is not satisfied and notifies the bandwidth control unit 252 of the individual bandwidth of each of the volumes 231 calculated by using the band ratio pair in which a difference between the performance levels is greater than the specified band ratio pair by a single level.

In this way, by using a greater number of band ratio pairs, it is possible to select the band ratio pairs in accordance with more detailed state and it is possible to more appropriately use the bandwidth.

Furthermore, in the fourth embodiment, the band ratio pair is determined by using Expression 14; however, the method of determining the band ratio pair is not limited to this. For example, the bandwidth management unit 102 may also use Expression 12 in the procedure of determining the band ratio pair described below.

The bandwidth management unit 102 calculates a by using the standard bandwidth ratio pair for Expression 12. If the calculated $\alpha$ is equal to or less than 1, the bandwidth management unit 102 calculates an individual bandwidth of each of the volumes 231 by using the standard bandwidth ratio pair for Expression 11 and notifies the bandwidth control unit 252 of the calculation result.

In contrast, if the calculated $\alpha$ is equal to or greater than 1, the bandwidth management unit 102 calculates $\alpha$ by using the off-time band ratio pair for Expression 12. If the calculation result indicates that $\alpha$ is equal to or less than 1, the bandwidth management unit 102 calculates an individual bandwidth of each of the volumes 231 by using the off-time band ratio pair for Expression 11 and notifies the bandwidth control unit 252 of the calculation result. In contrast, if $\alpha$ is greater than 1, the bandwidth management unit 102 calculates an individual bandwidth of each of the volumes 231 by using the standard bandwidth ratio pair for Expression 11 and notifies the bandwidth control unit 252 of the calculation result.

In this way, by using Expression 12 in the procedure of determining the band ratio pair, it is possible to reduce an amount of calculation when compared with a case of using Expression 14.

Third Modification

In the following, a modification of the fourth embodiment will be described. An operation management server according to the modification can calculate an individual bandwidth by using the band ratio between the set band ratios. In the following, a description will be given of a process in the case where an individual bandwidth is calculated by using the band ratio between the set band ratios.

The operation management server 1 according to the third modification includes a standard bandwidth ratio pair and an off-time band ratio pair. In the description below, the operation time band ratio of the standard bandwidth ratio pair is set to $W_{1H}:W_{1M}:W_{1L}$ and the startup time band ratio of the standard bandwidth ratio pair is set to $X_{1H}:X_{1M}:X_{1L}$. Furthermore, the operation time band ratio of the off-time band ratio pair is set to $W_{2H}:W_{2M}:W_{2L}$ and the startup time band ratio of the off-time band ratio pair is set to $X_{2H}:X_{2M}:X_{2L}$.

After the bandwidth management unit 102 acquires the maximum transfer capacity of the Tier pool 232, first, the bandwidth management unit 102 uses the standard bandwidth ratio pair for Expression 11 and calculates an individual bandwidth of each of the volumes 231. Then, the bandwidth management unit 102 calculates Expression 15 by using the individual bandwidth of each of the volumes 231 calculated by using the standard bandwidth ratio pair. In the description below, this calculation result is referred to as a "standard calculation result".

$$B_{MAX} - \left\{ \sum_{k=1}^{N} W_k(B_k - X_k\beta_k) + \sum_{k=1}^{N} X_k\beta_k \right\} \quad (15)$$

If the standard calculation result is equal to or less than 0, the bandwidth management unit 102 notifies the bandwidth control unit 252 of the individual bandwidth of each of the volumes 231 in the case where the standard bandwidth ratio pair is used. In contrast, if the standard calculation result is greater than 0, the bandwidth management unit 102 calculates an individual bandwidth of each of the volumes 231 by using the off-time band ratio pair for Expression 11. Then, the bandwidth management unit 102 calculates Expression 15 by using the individual bandwidth of each of the volumes 231 calculated by using the off-time band ratio pair. In the description below, this calculation result is referred to as an "off-time calculation result".

If the off-time calculation result is equal to or greater than 0, the bandwidth management unit 102 notifies the bandwidth control unit 252 of the individual bandwidth of each of the volumes 231 in the case where the off-time band ratio pair is used. In contrast, if the off-time calculation result is less than 0, the bandwidth management unit 102 sets the ratio represented by Expression 16 to the operation time band ratio. Furthermore, the bandwidth management unit 102 sets the ratio represented by Expression 17 to the startup time band ratio. Here, $Z_1$ represents the standard calculation result and $Z_2$ represents the off-time calculation result.

$$W_{1H} \frac{Z_1}{Z_1 - Z_2}(W_{2H} - W_{1H}): \quad (16)$$
$$W_{1M} \frac{Z_1}{Z_1 - Z_2}(W_{2M} - W_{1M}):$$
$$W_{1L} \frac{Z_1}{Z_1 - Z_2}(W_{2L} - W_{1L})$$

$$X_{1H} \frac{Z_1}{Z_1 - Z_2}(X_{2H} - X_{1H}): \quad (17)$$
$$X_{1M} \frac{Z_1}{Z_1 - Z_2}(X_{2M} - X_{1M}):$$
$$X_{1L} \frac{Z_1}{Z_1 - Z_2}(X_{2L} - X_{1L})$$

Figure 10:
FIG. 10 is a schematic diagram for explaining Expressions 16 and 17.

In the following, Expressions 16 and 17 will be described with reference to FIG. 10. FIG. 10 is a schematic diagram for explaining Expressions 16 and 17. Here, a description will be given of a case in which the performance level of the operation time band ratio is high. The vertical axis on the left side illustrated in FIG. 10 indicates the band difference calculated by using Expression 15 and the vertical axis on the right side indicates the operation time band ratio. Namely, in FIG. 10, each of the axes is arranged such that the band difference and the associated operation time band ratio have the same height.

At this point, if the band difference becomes 0, because the maximum transfer capacity of the entirety of the adjustment target Tier pool 232 is used, this state indicates that the bandwidths are most efficiently allocated. Thus, the operation time band ratio in which the band difference is 0 corresponds to the operation time band ratio that is used for the calculation. Here, if the band ratio pair indicated by Expressions 16 and 17 is used, as described above, $Z_1$ is positive and $Z_2$ is negative. Thus, the point in which the band difference becomes 0 is present between $Z_1$ and $Z_2$. Here, it is assumed that the relationship between the band difference and the operation time band ratio can be represented by the primary function. In this case, if the operation time band ratio in which the band difference becomes 0 is set to $W_H$, the ratio of the distance from $Z_1$ to 0 to the ratio of the distance from $Z_2$ to 0 is equal to the ratio of the distance from $W_{1H}$ to $W_H$ to the ratio of the distance from $W_{2H}$ to $W_H$. When solving this for $W_H$, the ratio when the performance level is high in Expression 16 is obtained.

In the above, a description has been given of the ratio when the performance level of the operation time band ratio is high; however, the startup time band ratio is the same in another performance level and thus the operation time band ratio and the startup time band ratio can be represented by Expressions 16 and 17.

However, because the relationship among the band difference, the operation time band ratio, and the startup time band ratio is not exactly the primary function, there may also be a case in which a band difference is not 0 even if Expression 15 is calculated by using the band ratio pair that is calculated from Expressions 16 and 17. In this case, the bandwidth management unit 102 repeatedly performs the following process. In the following, a description will be given by using the operation time band ratio as an example. In the description below, the band ratio pair that is newly calculated by using Expressions 16 and 17 is referred to as a "new band ratio pair".

The bandwidth management unit 102 calculates an individual bandwidth of each of the volumes 231 by using a new band ratio pair for Expression 11 and calculates Expression 15 by using the calculated individual bandwidth. If the calculation result is 0, the bandwidth management unit 102 notifies the bandwidth control unit 252 of the individual bandwidth calculated by using the new band ratio pair for Expression 11.

In contrast, if the calculation result is greater than 0, the bandwidth management unit 102 sets the calculation result to $Z_1$. Furthermore, the bandwidth management unit 102 substitutes, into Expressions 16 and 17, the operation time band ratio of the new band ratio pair, which is set to $_{1H}:W_{1M}:W_{1L}$, and the startup time band ratio of the new band ratio pair, which is set to $X_{1H}:X_{1M}:X_{1L}$, and recalculates a new band ratio pair.

Furthermore, if the calculation result is less than 0, the bandwidth management unit 102 sets the calculation result to $Z_2$. Furthermore, the bandwidth management unit 102 substitutes, into Expressions 16 and 17, the operation time band ratio of the new band ratio pair, which is set to $W_{2H}:W_{2M}:W_{2L}$ and the startup time band ratio of the new band ratio pair, which is set to $X_{2H}:X_{2M}:X_{2L}$, and recalculates a new band ratio pair.

By repeatedly performing the process described above, the bandwidth management unit 102 sets or approaches the calculation result of Expression 15 obtained by using the new band ratio pair to 0. However, even if the calculation result extremely approaches to 0, it may possibly take infinitely long time. Thus, if the number of calculations reaches a certain number of times or if the calculation result is within a certain error range, the bandwidth management unit 102 notifies the bandwidth control unit 252 of the individual bandwidth that is calculated by using the new band ratio pair at that time for Expression 11. It is preferable to previously define the certain number of times or the value of the certain error is the setup file or the like included in the bandwidth management unit 102.

Figure 11:
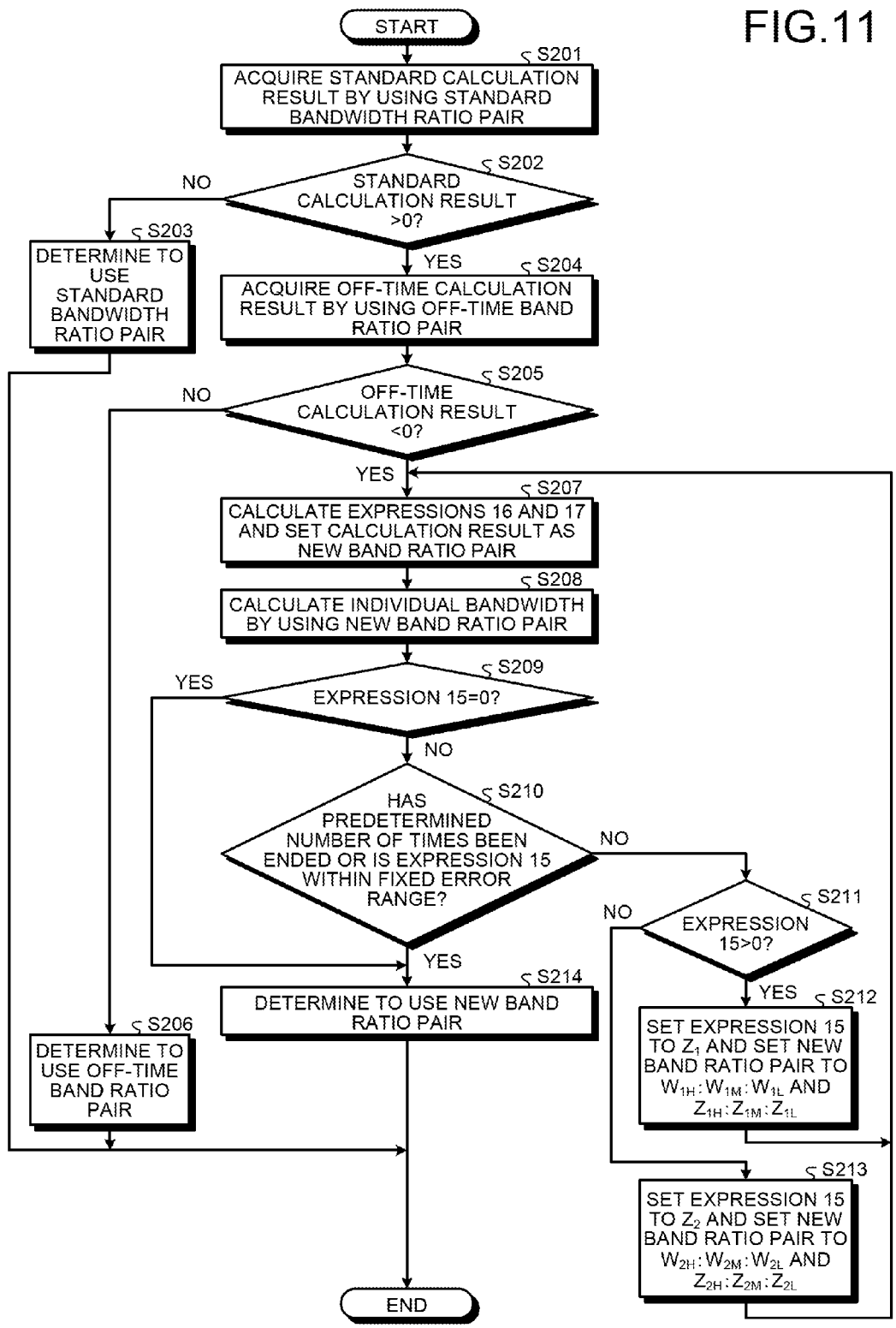
FIG. 11 is a flowchart illustrating the flow of a determination process of a band ratio pair performed by an operation management server according to a third modification.

In the following, the flow of the determination process performed by the band ratio pair according to the third modification will be described with reference to FIG. 11. FIG. 11 is a flowchart illustrating the flow of a determination process of a band ratio pair performed by an operation management server according to a third modification.

The bandwidth management unit 102 calculates an individual bandwidth of each of the volumes 231 by using the standard bandwidth ratio pair for Expression 11. Then, the bandwidth management unit 102 calculates Expression 15 by using the individual bandwidth of each of the volumes 231 calculated by using the standard bandwidth ratio pair and acquires the standard calculation result (Step S201).

The bandwidth management unit 102 determines whether the standard calculation result is greater than 0 (Step S202). If the standard calculation result is equal to or less than 0 (No at Step S202), the bandwidth management unit 102 determines that the standard bandwidth ratio pair is used to calculate the individual bandwidth (Step S203).

In contrast, if the standard calculation result is greater than 0 (Yes at Step S202), the bandwidth management unit 102 calculates an individual bandwidth of each of the volumes 231 by using the off-time band ratio pair for Expression 11. Then, the bandwidth management unit 102 calculates Expression 15 by using the individual bandwidth of each of the volumes 231 calculated by using the off-time band ratio pair and acquires the off-time calculation result (Step S204).

Then, the bandwidth management unit 102 determines whether the off-time calculation result is less than 0 (Step S205). If the off-time calculation result is equal to or greater than 0 (No at Step S205), the bandwidth management unit 102 determines that the off-time band ratio pair is used to calculate an individual bandwidth (Step S206).

In contrast, if the off-time calculation result is less than 0 (Yes at Step S205), the bandwidth management unit 102 calculates Expressions 16 and 17 by using the standard bandwidth ratio pair and the off-time band ratio pair and sets the calculation result as a new band ratio pair (Step S207).

Then, the bandwidth management unit 102 uses the new band ratio pair for Expression 11 and calculates an individual bandwidth of each of the volumes 231 (Step S208).

Then, the bandwidth management unit 102 calculates Expression 15 by using the new individual bandwidth of each of the volumes 231 calculated by using the band ratio pair. Then, the bandwidth management unit 102 determines whether the calculation result of Expression 15 obtained by using the new band ratio pair is 0 (Step S209). If the calculation result of Expression 15 is 0 (Yes at Step S209), the bandwidth management unit 102 proceeds to Step S214.

In contrast, if Expression 15 is not 0 (No at Step S209), the bandwidth management unit 102 determines whether a predetermined number of times of calculation of new band ratio pair has been ended or determines whether Expression 15 in the case where a new band ratio pair is used is within a fixed error range (Step S210). If the predetermined number of times has not been ended and Expression 15 is not within a fixed error range (No at Step S210), the bandwidth management unit 102 determines whether Expression 15 in the case where the new band ratio pair is used is greater than 0 (Step S211).

If Expression 15 is greater than 0 (Yes at Step S211), the bandwidth management unit 102 sets the calculation result of Expression 15 to $Z_1$ and sets the new band ratio pair to $W_{1H}:W_{1M}:W_{1L}$ and $Z_{1H}:Z_{1M}:Z_{1L}$ (Step S212). Then, the bandwidth management unit 102 returns to Step S207.

In contrast, if Expression 15 is equal to or less than 0 (No at Step S211), the bandwidth management unit 102 sets the calculation result of Expression 15 to $Z_2$ and sets the new band ratio pair to $W_{2H}:W_{2M}:W_{2L}$ and $Z_{2H}:Z_{2M}:Z_{2L}$ (Step S213). Then, the bandwidth management unit 102 returns to Step S207.

In contrast, if the predetermined number of times of calculation has been ended or if Expression 15 in the case where a new band ratio pair is used is within a fixed error range (Yes at Step S210), the bandwidth management unit 102 determines to use the new band ratio pair to calculate the individual bandwidth (Step S214).

Here, in the third modification, a description has been given of a case of using a predetermined number of times; however, the number of times is not limited to this. For example, the bandwidth management unit 102 may also end the calculation in a given time. In this case, in the setup file, the given time is defined.

Furthermore, in the third modification, a description has been given of a case in which two band ratio pairs are used; however, three or more band ratio pairs may also be used. For example, when three band ratio pairs are used, the bandwidth management unit 102 calculates Expression 15 by using the band ratio pair with the medium ratio. Then, if a band difference is equal to or greater than 0, the bandwidth management unit 102 calculates Expression 15 by using a band ratio pair with a smaller ratio difference among the performance levels. If the band difference is smaller than 0, the bandwidth management unit 102 calculates Expression 15 by using the band ratio pair with a ratio difference that is greater among the performance levels. After that, the bandwidth management unit 102 can determine an individual bandwidth by using the same calculation method as that used for the two band ratio pairs.

As described above, the operation management server according to the third modification can calculate an individual bandwidth by using the band ratio pair between a predetermined band ratio pair. Consequently, it is possible to further improve the use efficiency of the bandwidth.

[e] Fifth Embodiment

In the following, a fifth embodiment will be described. An operation management server according to the fifth embodiment allocates the minimum guarantee bandwidth to each of the volumes and then adds the bandwidth that is predicted to be wasted from among the allocated minimum guarantee bandwidth to the capacity of the Tier pool. In the following, a description will be given of a case in which a new function is added to the first embodiment. However, it is also possible to add the function described in the fifth embodiment to the second to the fourth embodiments. The operation management server according to the fifth embodiment is also represented by the block diagram illustrated in FIG. 8. In the description below, it is assumed that components having the same function as that performed in the first embodiment have the same function unless otherwise noted. However, the function described in the fifth embodiment can be added to the configuration of the first embodiment.

The bandwidth management unit 102 stores therein the list of the volumes 231 to each of which the minimum guarantee bandwidth is allocated. Then, the bandwidth management unit 102 acquires the use bandwidth of each of the volumes 231 included in the list that is stored at the time of the subsequent performance collection. Then, the bandwidth management unit 102 subtracts total use bandwidth of each of the volumes 231 included in the list from the total minimum guarantee bandwidth of each of the volumes 231 included in the list and calculates a sum total of the bandwidths that are not used from among the allocated minimum guarantee bandwidths (hereinafter, referred to as an "unused bandwidth").

Then, the bandwidth management unit 102 sets a value obtained by adding the calculated unused bandwidth to the maximum transfer capacity of the adjustment target Tier pool 232 as the maximum transfer capacity of the adjustment target Tier pool 232.

Then, the bandwidth management unit 102 calculates α by using the newly set maximum transfer capacity of the adjustment target Tier pool 232 and calculates an individual bandwidth of each of the volumes 231 from Expression 8. Thereafter, the bandwidth management unit 102 notifies the bandwidth control unit 252 of the calculated individual bandwidth of each of the volumes 231.

Figure 12:
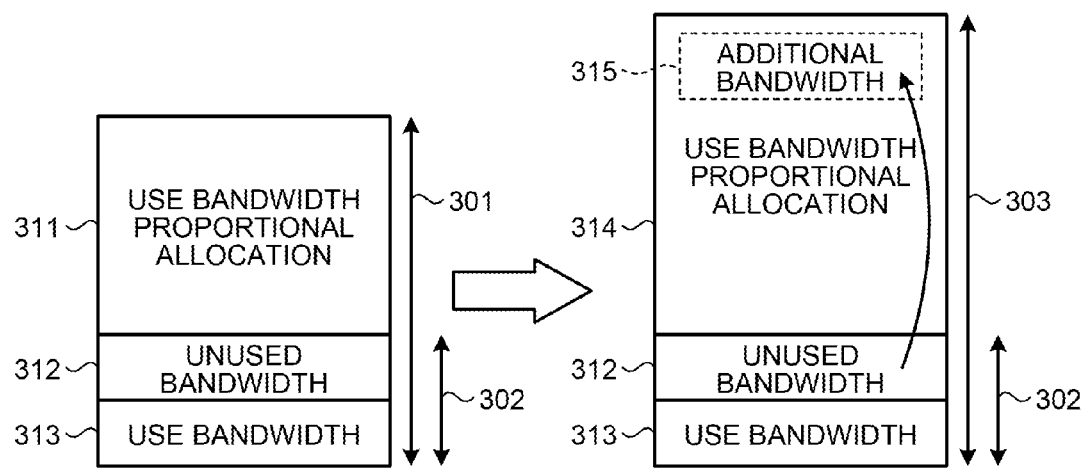
FIG. 12 is a schematic diagram for explaining an addition of an unused bandwidth performed by an operation management server according to a fifth embodiment.

In the following, an addition of an unused bandwidth performed by the operation management server 1 according to the fifth embodiment will be described with reference to FIG. 12. FIG. 12 is a schematic diagram for explaining an addition of an unused bandwidth performed by an operation management server according to a fifth embodiment.

Before the addition of an unused bandwidth, use bandwidth proportional allocation 311 is used for allocating the bandwidth that is in accordance with the use bandwidth. Then, the sum total of the use bandwidth proportional allocation 311 and a minimum guarantee bandwidth 302 corresponds to a maximum transfer capacity 301 of the Tier pool 232. Furthermore, an unused bandwidth 312 and a use bandwidth 313 are included in the minimum guarantee bandwidth 302.

In this state, the unused bandwidth 312 is wasted. Namely, the bandwidth has a margin by an amount corresponding to the unused bandwidth 312. Thus, the bandwidth with the same amount as that of the unused bandwidth 312 is added to the maximum transfer capacity 301 in the Tier pool 232 and then the maximum transfer capacity of the Tier pool 232 is extended to a maximum transfer capacity 303. This becomes a value greater than that of the actual maximum transfer capacity of the Tier pool 232; however, because there is the margin corresponding to the amount of the unused bandwidth 312, the sum total of the use bandwidth is predicted to be within the maximum transfer capacity 303. In this case, the minimum guarantee bandwidth 302 does not change. Thus, a use bandwidth proportional allocation 314 obtained by subtracting the minimum guarantee bandwidth 302 from the maximum transfer capacity 303 can be used to allocate the bandwidth that is in accordance with the use bandwidth. Namely, it is possible to use the bandwidth by an amount corresponding to an additional bandwidth 315 to allocate the bandwidth that is in accordance with the use bandwidth when compared with the bandwidth before the maximum transfer capacity is extended.

In the following, the effect of the operation management server 1 according to the fifth embodiment will be described.

For example, if the number of volumes is increased, an amount of allocation for the minimum guarantee bandwidth is increased and thus an amount of allocation that is in accordance with the use bandwidth is decreased. In this case, at the time of operation, instead of the allocation of the bandwidth that is in accordance with the use bandwidth at the time of operation, the allocation approaches the allocation of the bandwidth that is in accordance with the use bandwidth at the time of startup.

Figure 13:
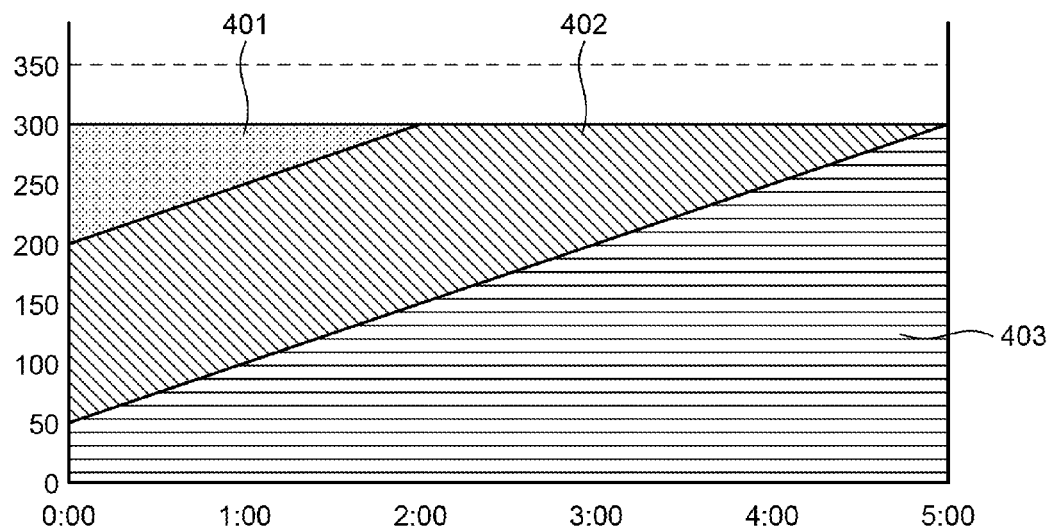
FIG. 13 is a schematic diagram illustrating the transition of an allocation state of the bandwidth in the case where a volume is added every hour.

FIG. 13 is a schematic diagram illustrating the transition of an allocation state of the bandwidth in the case where a volume is added every hour. The vertical axis illustrated in FIG. 13 indicates the allocation bandwidth and the horizontal axis indicates the time elapsed. Furthermore, in FIG. 13, an area 401 indicates the transition of an unallocated bandwidth, an area 402 indicates the transition of the sum total of the allocation of the bandwidth at the time of operation, and an area 403 indicates the transition of the sum total of the minimum guarantee bandwidth. For example, if a volume is added every one hour, as indicated by the area 401, the unallocated bandwidth disappears over time. Then, as indicated by the area 402, the allocation of the bandwidth at the time of operation also disappears. Finally, as indicated by the area 403, the allocation becomes the state in which only the minimum guarantee bandwidth is allocated.

However, a case in which startup processes are simultaneously performed is less likely to occur and, furthermore, it is also conceivable of a case in which the band of the minimum guarantee bandwidth or below is only used in an operation state. Furthermore, the peak time of a use often varies for each of the volumes 231. Consequently, if the minimum guarantee bandwidth is always secured in all of the volumes 231, an amount of the unused bandwidth is increased in the secured minimum guarantee bandwidth and thus there is a high possibility that a waste is generated.

However, if an unused bandwidth is present, if another volume 231 that is in operation uses a greater bandwidth, and if an extended flexibility function is provided, because a temporary allocation is performed, it is possible to avoid generating a waste of bandwidth that is not in use. However, with the extended flexibility function, for example, the adjustment of allocation that is performed by using the performance level described in the third embodiment is not performed and all of the volumes 231 with any performance levels can receive the flexibility.

In contrast, the operation management server 1 according to the fifth embodiment adds an unused bandwidth to the maximum transfer capacity and distributes the bandwidth to each of the volumes 231, whereby it is possible to eliminate an unused bandwidth and suppress the generation of waste. Furthermore, by performing allocation using the performance level by using the bandwidth in which an unused bandwidth is added to the maximum transfer capacity, each of the volumes 231 can receive the flexibility of the bandwidth in accordance with the performance level.

Fourth Modification

In the fifth embodiment, the most recent unused bandwidth is used as an addition; however, the value used as the addition is not limited to this. In the fourth modification, the minimum value of an unused bandwidth for a certain time period is used as the addition.

The bandwidth management unit 102 acquires and holds an unused bandwidth of the volume 231 to which the minimum guarantee bandwidth is allocated at the time of each performance collection. Furthermore, when an individual bandwidth of each of the volumes 231 is calculated, the bandwidth management unit 102 acquires the minimum value from among the unused bandwidth of each of the volumes 231 acquired within a predetermined time period after that time point. Then, the bandwidth management unit 102 newly calculates the maximum transfer capacity by adding a value of the sum total of the minimum values from among the acquired unused bandwidth of each of the volumes 231 to the maximum transfer capacity of the adjustment target Tier pool 232. Then, the bandwidth management unit 102 calculates an individual bandwidth of each of the volumes 231 by using the calculated new maximum transfer capacity.

At this point, it is conceivable that the load applied to the storage device 2 varies depending on time or a day of a week. Thus, the bandwidth management unit 102 may also collect an unused bandwidth per time by dividing the time, instead of simply collecting information on the unused bandwidth for a long time period. In this case, the bandwidth management unit 102 calculates the maximum transfer capacity by using an unused band for each time that is divided in accordance with the calculation time zone of the individual bandwidth.

As described above, the operation management server according to the fourth modification collects data for a certain time period and determines the minimum unused bandwidth from the collected data, whereby it is possible to increase the prediction accuracy and it is possible to perform allocation of more appropriate bandwidth. Furthermore, by using the minimum value, even in a case of erroneous prediction, it is possible to suppress the use bandwidth within the maximum transfer capacity of the Tier pool.

According to an aspect of an embodiment of the storage management device, the storage management method, and the storage management program disclosed in the present invention, an advantage is provided in that the bandwidth is efficiently used.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage management device comprising:
a processor that executes a process comprising:
acquiring load information on a storage area group that includes therein a plurality of storage areas;
first calculating, based on the load information on the storage area group acquired at the acquiring, an entire bandwidth of the storage area group;
second calculating, based on the entire bandwidth and a minimum guarantee bandwidth, a coefficient used for allocation in accordance with a use bandwidth based on the bandwidths that are actually used in a process that uses each of the storage areas; and
third calculating, based on the minimum guarantee bandwidth and the coefficient calculated at the second calculating for each of the predetermined storage areas, each of individual bandwidths such that the sum total of the individual bandwidths allocated to the respective storage areas corresponds to the entire bandwidth calculated at the first calculating and allocates the calculated individual bandwidths to the respective storage areas, each of the individual bandwidths based on the minimum guarantee bandwidth and the coefficient.

2. The storage management device according to claim 1, wherein the process further comprises measuring the bandwidth, which is used at the time of startup by an application that uses the storage areas, and fourth calculating the minimum guarantee bandwidth based on the measured bandwidth.

3. The storage management device according to claim 1, wherein the third calculating calculates the individual bandwidths by adding the weighting in accordance with a performance level specified for each of the storage areas.

4. The storage management device according to claim 3, wherein the third calculating changes the weighting in accordance with the use state of the bandwidths.

5. The storage management device according to claim 1, wherein the third calculating calculates an extension entire bandwidth by adding an unused bandwidth in the minimum guarantee bandwidth to the entire bandwidth and calculates each of the individual bandwidths such that the sum total of the individual bandwidths corresponds to the extension entire bandwidth.

6. A storage management method comprising:
acquiring, using a processor, load information on a storage area group that includes therein a plurality of storage areas;
calculating, using a processor, an entire bandwidth of the storage area group based on the load information on the storage area group;
calculating, using a processor, based on the entire bandwidth and a minimum guarantee bandwidth, a coefficient used for allocation in accordance with a use bandwidth based on the bandwidths that are actually used in a process that uses each of the storage areas; and
calculating, using a processor, based on the minimum guarantee bandwidth and the coefficient calculated for each of the predetermined storage areas, each of individual bandwidths such that the sum total of the individual bandwidths allocated to the respective storage areas corresponds to the entire bandwidth and allocating the calculated individual bandwidths to the respective storage areas.

7. A non-transitory computer-readable recording medium having stored therein a program that causes a computer to execute a storage management program comprising:
acquiring load information on a storage area group that includes therein a plurality of storage areas;
calculating an entire bandwidth of the storage area group based on the load information on the storage area group;
calculating based on the entire bandwidth and a minimum guarantee bandwidth, a coefficient used for allocation in accordance with a use bandwidth based on the bandwidths that are actually used in a process that uses each of the storage areas; and
calculating, based on the minimum guarantee bandwidth and the coefficient calculated for each of the predetermined storage areas, each of individual bandwidths such that the sum total of the individual bandwidths allocated to the respective storage areas corresponds to the entire bandwidth and allocating the calculated individual bandwidths to the respective storage areas.

* * * * *